(12) United States Patent
Bourdev et al.

(10) Patent No.: US 7,716,157 B1
(45) Date of Patent: May 11, 2010

(54) SEARCHING IMAGES WITH EXTRACTED OBJECTS

(75) Inventors: Lubomir Bourdev, San Jose, CA (US); Claire Schendel, Petaluma, CA (US); Jeffery Scott Heileson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 114 days.

(21) Appl. No.: 11/341,247

(22) Filed: Jan. 26, 2006

(51) Int. Cl.
*G06F 7/00* (2006.01)
(52) U.S. Cl. .................. 707/2; 707/3; 707/4; 707/5; 707/6
(58) Field of Classification Search .................. 707/2
See application file for complete search history.

(56) References Cited

U.S. PATENT DOCUMENTS

| | | | |
|---|---|---|---|
| 4,651,146 A | 3/1987 | Lucash et al. | |
| 5,943,093 A | 8/1999 | Anderson et al. | |
| 5,963,203 A | 10/1999 | Goldberg et al. | |
| 6,182,069 B1 * | 1/2001 | Niblack et al. ............. | 707/6 |
| 6,324,555 B1 | 11/2001 | Sites | |
| 6,366,296 B1 | 4/2002 | Boreczky et al. | |
| 6,714,672 B1 | 3/2004 | Berestov et al. | |
| 6,728,728 B2 | 4/2004 | Spiegler et al. | |
| 6,879,709 B2 | 4/2005 | Tian et al. | |
| 6,940,545 B1 | 9/2005 | Ray et al. | |
| 7,155,036 B2 * | 12/2006 | Li ........................ | 382/118 |
| 7,171,023 B2 | 1/2007 | Kim et al. | |
| 7,274,832 B2 * | 9/2007 | Nicponski ............. | 382/297 |
| 7,343,365 B2 | 3/2008 | Farnham et al. | |
| 7,403,642 B2 | 7/2008 | Zhang et al. | |
| 7,477,805 B2 | 1/2009 | Ohtsuka et al. | |
| 7,519,200 B2 | 4/2009 | Gokturk et al. | |
| 7,587,101 B1 | 9/2009 | Bourdev | |
| 2001/0053292 A1 | 12/2001 | Nakamura | |
| 2002/0074398 A1 | 6/2002 | Lancos et al. | |
| 2002/0103813 A1 | 8/2002 | Frigon | |
| 2003/0023754 A1 | 1/2003 | Eichstadt et al. | |
| 2003/0033296 A1 | 2/2003 | Rothmuller et al. | |
| 2003/0210808 A1 | 11/2003 | Chen et al. | |
| 2004/0008906 A1 | 1/2004 | Webb | |
| 2004/0017930 A1 * | 1/2004 | Kim et al. ............. | 382/103 |
| 2004/0060976 A1 | 4/2004 | Blazey et al. | |
| 2004/0064455 A1 | 4/2004 | Rosenzweig et al. | |
| 2004/0101212 A1 | 5/2004 | Fedorovskaya et al. | |
| 2004/0204635 A1 | 10/2004 | Scharf et al. | |
| 2004/0267612 A1 | 12/2004 | Veach | |

(Continued)

OTHER PUBLICATIONS

Jannifer Granick, "Face It: Privacy Is Endangered", Dec. 7, 2005.*

(Continued)

*Primary Examiner*—Hung T Vy
*Assistant Examiner*—Binh V Ho
(74) *Attorney, Agent, or Firm*—Van Pelt, Yi & James LLP

(57) ABSTRACT

Presenting a subset is disclosed. Information associated with a set of one or more objects is obtained, where the set of one or more objects have been detected from a collection of one or more images. Object search criteria is obtained. A subset of the collection is determined based at least in part on the object search criteria. The subset is presented.

23 Claims, 16 Drawing Sheets

U.S. PATENT DOCUMENTS

| | | | |
|---|---|---|---|
| 2005/0011959 A1 | 1/2005 | Grosvenor | |
| 2005/0013488 A1 | 1/2005 | Hashimoto et al. | |
| 2005/0025376 A1 | 2/2005 | Ishida | |
| 2005/0041114 A1 | 2/2005 | Kagaya | |
| 2005/0046730 A1 | 3/2005 | Li | |
| 2005/0050027 A1 | 3/2005 | Yeh et al. | |
| 2005/0063568 A1* | 3/2005 | Sun et al. | 382/117 |
| 2005/0105779 A1 | 5/2005 | Kamei | |
| 2005/0117870 A1 | 6/2005 | Lee | |
| 2005/0128221 A1 | 6/2005 | Aratani et al. | |
| 2005/0129276 A1 | 6/2005 | Haynes et al. | |
| 2005/0147302 A1 | 7/2005 | Leung | |
| 2005/0157952 A1 | 7/2005 | Gohda et al. | |
| 2005/0172215 A1 | 8/2005 | Swuibbs et al. | |
| 2005/0196069 A1 | 9/2005 | Yonaha | |
| 2005/0207630 A1 | 9/2005 | Chan et al. | |
| 2005/0213793 A1* | 9/2005 | Oya et al. | 382/103 |
| 2005/0285943 A1 | 12/2005 | Cutler | |
| 2006/0008145 A1* | 1/2006 | Kaku | 382/173 |
| 2006/0008152 A1 | 1/2006 | Kumar et al. | |
| 2006/0032916 A1 | 2/2006 | Mueller et al. | |
| 2006/0050934 A1* | 3/2006 | Asai | 382/118 |
| 2006/0053364 A1 | 3/2006 | Hollander et al. | |
| 2006/0071942 A1 | 4/2006 | Ubillos et al. | |
| 2006/0098737 A1 | 5/2006 | Sethuraman et al. | |
| 2006/0120572 A1* | 6/2006 | Li et al. | 382/118 |
| 2006/0140455 A1* | 6/2006 | Costache et al. | 382/118 |
| 2006/0161588 A1* | 7/2006 | Nomoto | 707/104.1 |
| 2006/0171573 A1 | 8/2006 | Rogers | |
| 2006/0222243 A1* | 10/2006 | Newell et al. | 382/173 |
| 2006/0251338 A1 | 11/2006 | Gokturk et al. | |
| 2007/0071323 A1* | 3/2007 | Kontsevich et al. | 382/190 |
| 2007/0081744 A1* | 4/2007 | Gokturk et al. | 382/305 |
| 2007/0098303 A1 | 5/2007 | Gallagher et al. | |
| 2007/0183638 A1* | 8/2007 | Nakamura | 382/128 |
| 2007/0242856 A1* | 10/2007 | Suzuki et al. | 382/103 |
| 2008/0080745 A1* | 4/2008 | Vanhoucke et al. | 382/118 |
| 2009/0016576 A1 | 1/2009 | Goh et al. | |
| 2009/0160618 A1 | 6/2009 | Kumagai et al. | |

OTHER PUBLICATIONS

Michael Arrington, "First Screen Shots of Riya", Oct. 26, 2005.*
U.S. Appl. No. 11/097,951, Newell et al.
Riya—Photo Search. http://www.riya.com.
Riya—Photo Search. http://www.riya.com/corp/learn-more.jsp.
Riya—Photo Search. http://www.riya.com/corp/learn-more-s2.jsp.
Riya—Photo Search. http://www.riya.com/corp/learn-more-s3.jsp.
Riya—Photo Search. http://www.riya.com/corp/learn-more-s5.jsp.
Riya—Photo Search. http://www.riya.com/corp/learn-more-s6.jsp.
Schneiderman, Henry. "A Statistical Approach to 3D Object Detection." Robotics Institute. Carnegie Mellon University, Pittsburgh, PA. 2000.
"Notes and Tags". p. 3 pf 6, .Jan. 4, 2006 http://www.flickr.com/learn_more.3.gne.
Yang et al. "Detecting Faces in Images: A Survey." IEEE Transactions of Pattern Analysis and Machine Intelligence, vol. 4, No. 1. Jan. 2002. pp. 34-58.
Yang, Ming-Hsuan. "Recent Advances in Face Detection." Honda Research Institute, Mountain View, CA., 2003.
Gormish, Michael J.. "JPEG 2000: Worth the Wait?" Ricoh Silicon Valley, Inc. pp. 1-4., Aug. 1999.
Sun et al. "Quantized Wavelet Features and Support Vector Machines for On-Road Vehicle Detection." Dept. of Computer Science, U. of Nevada, Reno & e-Technology Dept., Ford Motor Company, Dearborn, MI. pp. 1-6., Dec. 2002.
Pentland et al. (Jun. 1996) "Photobook: Content-based manipulation of image databases," Int'l J. Computer Vision, vol. 18 No. 3, pp. 233-254.
Ma et al. (Sep. 2000) "An indexing and browsing system for home vido," Proc. 2000 European Signal Processing Conf., pp. 131-134.

* cited by examiner

SEARCHING IMAGES WITH EXTRACTED OBJECTS

BACKGROUND OF THE INVENTION

Automatic detection processes can be used to detect objects in an image and can be a powerful tool. For example, a face detection process can detect faces of people in an image. With digital cameras becoming increasingly popular, more and more digital images are being created. However, as a user's collection of images grows, it becomes increasingly difficult to manage the collection. Face detection technology and other automatic detection processes generate data using the images that are processed. It may be useful to leverage the data generated during an automatic detection process to assist in managing a collection of images.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
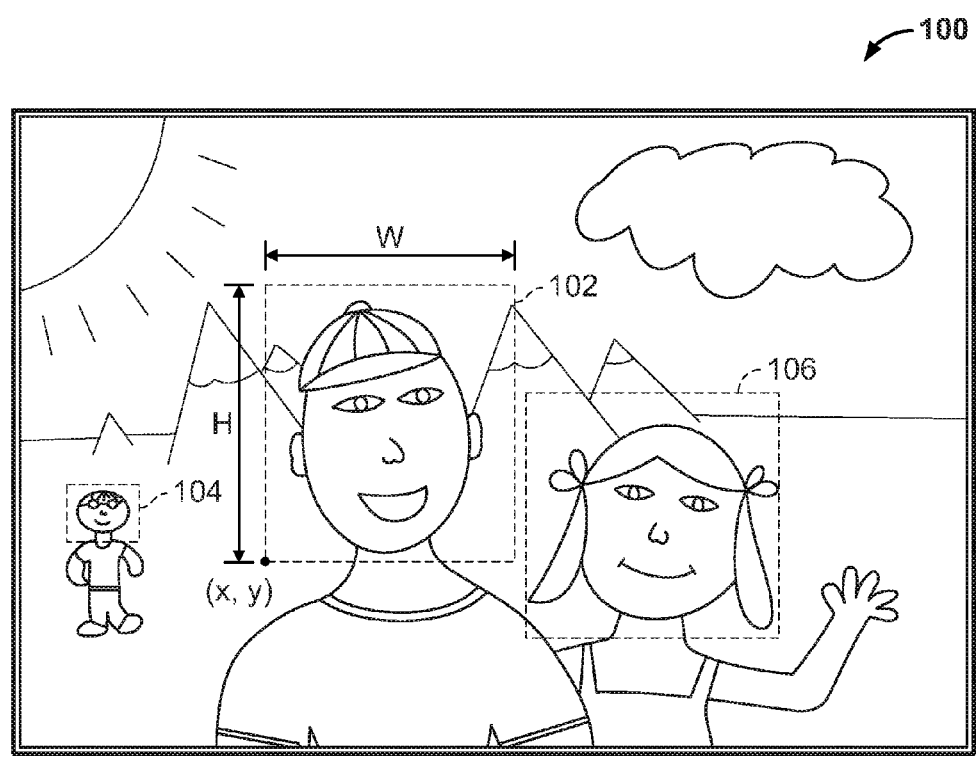
FIG. 1A is a diagram illustrating an embodiment of an image and objects that are detected from the image.

FIG. 1A is a diagram illustrating an embodiment of an image and objects that are detected from the image. In the example shown, image 100 may be a file in a variety of formats, including Joint Photographic Experts Group (JPEG), Graphics Interchange Format (GIF), Tagged Image File Format (TIFF), and Portable Network Graphics (PNG). In some embodiments, image 100 is generated using a digital camera. Although images may be described in the examples herein, any visual data (including video, streaming video, and graphical data) may be used.

Automatic detection processing is performed on image 100. Automatic detection processing detects occurrences of a detection object in an image. Automatic detection processing may be performed using various techniques. For example, Eigenfaces, Adaboost, neural networks, may be used. A two dimensional pattern matching technique may be used. A three dimensional model of the object may be used to approximate the object. In some embodiments, the detection object is a face and Adobe® Photoshop® Elements is used for automatic face detection.

Objects are output by an automatic detection process and are believed by the automatic detection process to include an occurrence of the detection object. Automatic detection processes do not necessarily attempt to detect a particular detection object (for example, the face of a particular person). Rather, the process may attempt to detect any occurrence of a detection object in an image (for example, the face of any person). In some embodiments, including this example, each object includes one and only one occurrence of a detection object. Examples of detection objects include a face, person, animal, car, boat, book, table, tree, mountain, etc.

Objects may be associated with a subimage or a portion of an image and may be described in a variety of ways. In this example, objects are approximated with a rectangular shape. In some embodiments, objects output by an automatic detection process have a non-rectangular shape, such as a round shape. Object 102 may be described by coordinates (x, y). Coordinates (x, y) may describe the location of the lower left corner of object 102 with respect to the origin (i.e., the lower left corner of image 100). A variety of units may be used for coordinates (x, y), such as pixels or millimeters. Object 102 in this example is also described by a height, H, and a width, W. In some embodiments, objects output by an automatic detection process have a fixed aspect ratio (i.e., a fixed width to height ratio). For example, although the sizes of objects 102 and 104 are different, the aspect ratios of the two objects may be the same.

Additional information associated with each object may be output by an automatic detection process. In some embodiments, a probability that a given object includes an occurrence of the detection object is output. For example, a face detection process may generate a probability that object 106 includes a face. In some embodiments, one or more angles are output by an automatic detection process. An angle may be associated with an orientation, rotation, or tilt of the occurrence of the detection object. For example, one angle may describe the tilt of the face with respect to a vertical axis. Another angle may describe the rotation of the face.

Automatic detection processes can be imperfect. Sometimes, an automatic detection process may not be able detect an occurrence of a detection object. For example, some face detection processes may not be able to detect the face of a person if the face is too small in an image. An automatic detection process can also generate "false alarms." A face detection process may output an object that does not include a face.

In some embodiments, subsequent processing may be performed on an image or an associated object after automatic detection processing. In some embodiments, automatic object identification is performed. For example, a face identification process may be performed where detected objects are evaluated to determine whether the objects contain the face of a particular person. Identification may be performed using various techniques. For example, a technique based on Adaboost, Linear Discriminant Analysis (LDA), or principal component analysis (PCA) may be used to perform object identification. In some embodiments, an automatic matching process is performed. For example, a face matching process is performed, where multiple objects from multiple images are compared and similar faces are matched together.

Object detection may be automatic or manual. For example, a user may have drawn a box around any of faces 102, 104, and 106 to detect a face. The output of a manual detection process may include the same information as the output of an automatic detection process. The probability that a manually detected object includes the detection object may be set to 1.

TABLE 1

| Object ID | Source File ID | Coordinates of Origin | Width | Height | Angle | P(Object = Detection Object) | Date Object Detected | Manually or Automatically Detected |
|---|---|---|---|---|---|---|---|---|
| 1 | 1 | x0, y0 | 5 | 8 | 0 | 0.8 | Jan. 1, 2005 | Automatically |
| 2 | 1 | x1, y1 | 5 | 7 | 5 | 0.7 | Jan. 1, 2005 | Automatically |
| 3 | 1 | x2, y2 | 1 | 1 | 0 | 0.5 | Jan. 1, 2005 | Automatically |
| 4 | 2 | x3, y3 | 2 | 2 | 0 | 0.6 | Nov. 2, 2005 | Automatically |
| 5 | 2 | x4, y4 | 3 | 4 | 20 | 0.7 | Nov. 2, 2005 | Automatically |
| 6 | 2 | x5, y5 | 1 | 1 | 0 | 1 | Nov. 22, 2005 | User |

In some embodiments, tags are used. Tagging refers to the process of assigning a tag to an object or image. A user or an automatic process may assign a tag. A tag includes tag data. Tag data may be user specified or machine specified. Examples of tag data include a name, place, event, date, etc. A tag may represent descriptive information associated with an object or image. For example, a vacation photographed may be tagged with "Boston," "Mom," or "Fourth of July." Tag data may include any type of data, including text, image, audio, or video. Tag data may include free form text or keywords. The same tag may be assigned to more than one object and/or image. An object or image may have multiple tags.

Table 2 lists examples of information that may be stored for various tags. Such information may be stored in one or more of a database, file metadata, file, or in any other appropriate way.

TABLE 2

| Tag ID | Tag Data | Object(s) Being Tagged | P(Object = Tag Data) | User or Machine Assigned | User or Machine Specified Tag Data | Tag Icon or Object ID to Use for Tag Icon |
|---|---|---|---|---|---|---|
| 1 | Bob | 1, 6 | 0.6, 1 | Machine, User | User | Object ID 1 |
| 2 | Janet | 4 | 0.5 | User | User | Object ID 2 |
| 3 | teeth | 1 | 1 | User | User | icon1.jpg |
| 4 | hat | 1 | 1 | User | User | icon2.jpg |
| 5 | mountains | 1, 2, 3 | 0.8, 0.7, 1 | Machine, Machine, User | Machine | icon3.jpg |

Figure 1B:
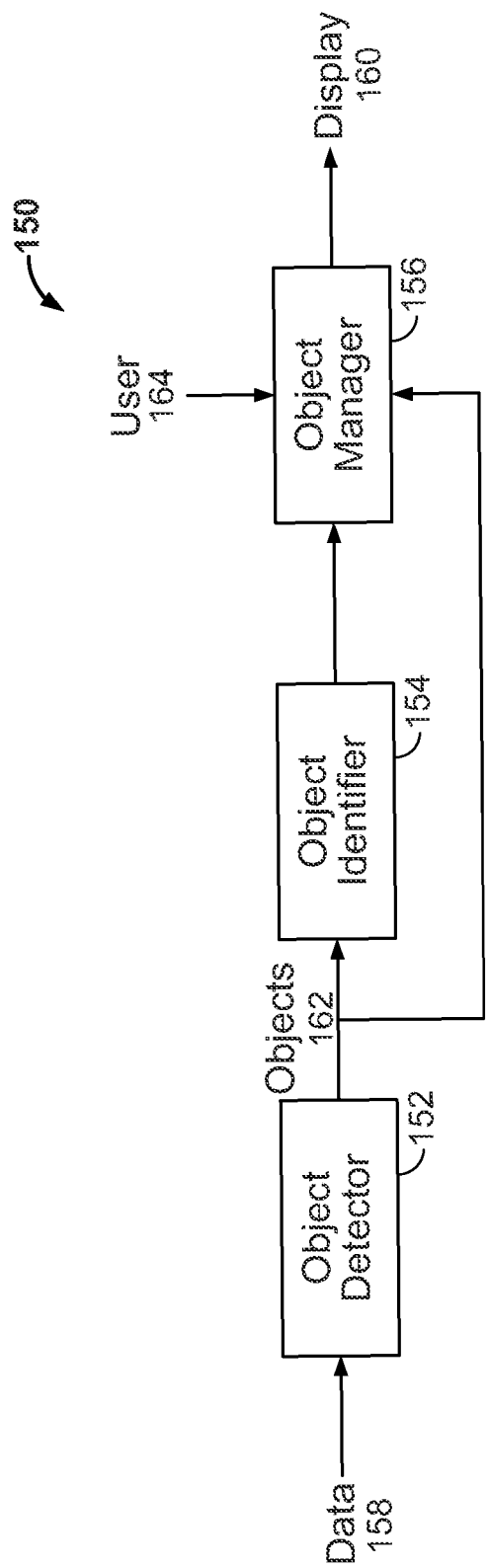
FIG. 1B is a block diagram illustrating an embodiment of a system for detecting and processing objects.

FIG. 1B is a block diagram illustrating an embodiment of a system for detecting and processing objects. In this example, system 150 includes object detector 152, object identifier 154, and object manager 156. Data 158 is input to object detector 152. Data 158 may include an image, video, audio clip, and/or other data. Object detector 152 performs an object detection process to detect occurrences of detection objects in data 158. Object detector 152 may detect any occurrence of a detection object (e.g., any face). Object detector 152 provides detected objects 162 as output.

Objects 162 are provided as input to object identifier 154, which identifies detection objects. For example, object detector 152 may detect any face, and object identifier 154 may identify the face as belonging to a specific person. Object identifier may output one or more names associated with one or more of objects 162. In some embodiments, object identifier 154 assigns a tag (such as the tag "Bob") to an object. Objects 162 and the output of object identifier 154 are provided as input to object manager 156. User input 164 may also be provided as input to object manager 156.

Object manager 156 manages objects 162. In some embodiments, object manager 156 is used to search through a collection of images based on object search criteria. The object search criteria may include any information generated during an object detection process. For example, the object search criteria may include the size of an object, a probability generated by an automatic detection process, an angle associated with an occurrence of a detection object detected in an object, etc. In some embodiments, object manager 156 outputs a subset of the collection of images. In some embodiments, search related data is generated and output by object manager 156. For example, a search probability may be output for each image in a collection of images being searched.

Figure 2:
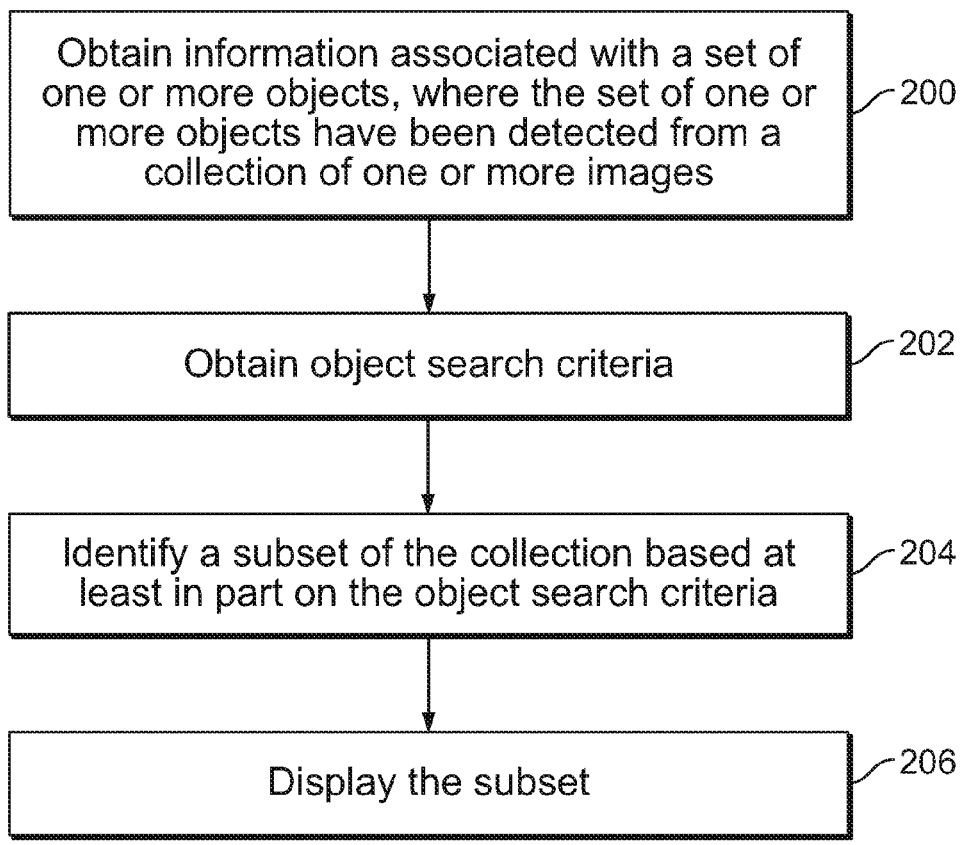
FIG. 2 is a flowchart illustrating an embodiment of searching through a collection of images associated with detected objects.

FIG. 2 is a flowchart illustrating an embodiment of searching through a collection of images associated with detected objects. In the example shown, a search through the collection is performed using object search criteria. Information associated with a set of one or more objects, where the set of one or more objects have been detected from a collection of one or more images, is obtained at 200. The collection of one or more images comprises the images that are searched. A user may specify the collection and a variety of interfaces and interactions with an interface may be used. In some embodiments, each image in the collection is associated with at least one object. An object may be detected using an automatic detection process or may be detected manually by a user. Although the following examples may illustrate examples with objects that are associated with faces, images and objects that are associated with other detection objects (such as animals, cars, etc.) may be used.

In some embodiments, a table, database, or other memory structure may be used to collectively store object related information for a number of images. The location of a memory structure and/or access to a memory structure may be provided at 200. In some embodiments, object related information may be stored separately with each image file. For example, information associated with objects detected from a first image may be stored as metadata in the first image file (e.g., digiphoto1.jpg) and information associated with objects detected from a second image are stored in another file (e.g., digiphoto2.jpg). Information obtained at 200 may be obtained from any appropriate source.

At 202, object search criteria is obtained. Object search criteria is defined to be a parameter, value, characteristic, or other information related to an object used in a search. For example, object search criteria can include the number of objects associated with an image. A user may want to find a group picture with many people, or a picture of two people. Dimension or size information associated with an object may be used as object search criteria. For example, a user may want to find a picture that was taken at a scenic location. To include the scenery in the picture, the faces in the picture may be relatively small and the object search criteria may be used to specify small objects. Location information associated with the objects may be used as object search criteria. For example, the user may remember that a desired picture depicts people in the right hand side of the image. The object search criteria may specify an object's location or placement. The location or placement of an object may be with respect to the associated image, or may be with respect to another object.

Object search criteria may include a time or date associated with an object. In some embodiments, a time/date is associated with an image that includes an object. For example, an image may be associated with the time/date a photographer took the picture. A user may be able to search based on a time/date associated with an image. In some embodiments, an object may be associated with a date and/or time corresponding to when an automatic or manual detection process was performed. An object search criteria may include a time/date associated with a manual or an automatic detection process. In one example, a user may remember that a desired picture was taken on Memorial Day, and the user may have run an automatic detection process on the images within a few days. A user may search for images that have objects with a time/date from Memorial Day until a few days afterwards. Ranges, minimum, and maximum values may be used in object search criteria, not only with times/dates but other object search criteria as well.

In some embodiments, tag related information may be used in a search. In some cases, a tag is assigned to an object and the object search criteria includes tag information associated with an object. For example, a user may want to find images that have objects tagged with "Bob" and the object search criteria be used to search for objects with that tag. In some cases, a tag may be assigned to an image as opposed to an object detected from an image. A tag assigned to an image could have been assigned before an automatic detection process is performed or before a user manually detects objects in an image. Tag information associated with an image may be used in a search in addition to object search criteria. For example, a user may search for images that have the tag "Lake Tahoe" assigned to the image and that are associated with exactly two objects.

Object search criteria may comprise a single criterion. For example, a user may want to search for images with a certain number of objects and may not specify additional object search criteria. In some embodiments, the object search criteria may comprise multiple criteria. Boolean operators (such as the AND operator and the OR operator) may be used. For example, a user may want to search for images that have three objects AND one of the objects is tagged with "Bob." In another example, a user may want to search for images with objects having a certain minimum size OR objects with a certain orientation. (Capitalized "AND" and "OR" are used to illustrate Boolean operators. It is to be understood that subsequent examples may refer to Boolean operators even if un-capitalized "and" and "or" are used.)

Any information associated with an object or an image that has objects may be used in a search process. For example, any of the information described in Tables 1 and/or 2 may be used in a search. Information such as whether a person has accessories (such as eyeglasses, sunglasses, hats, visors, etc.), an expression or emotion of a person (such as smiling, crying, laughing, surprised, etc.), gender, age, a person's size, skin tone, and such may be used in a search. The information used may be the output of a process or may be generated by a user.

Information obtained at 200 may correspond to the object search criteria obtained at 202. The example process may be performed in any appropriate order; in some embodiments 202 is performed before 200. This may enable a more efficient search process. For example, if the object search criteria obtained at 202 is to search for images with three or more objects, it may not be necessary at 200 to obtain coordinates, heights and widths, etc.

At 204, a subset of the collection is determined based at least in part on the object search criteria. The subset may include the results of a search through the collection for images that satisfy the object search criteria (and possibly any additional search criteria) to varying degree(s). In some embodiments, there are multiple object search criteria, and an image may be included in the subset even if it satisfies only some of the object search criteria. For example, a user may want to search for images with two objects where one of the objects is tagged "Bob." In some cases, an image with two objects where the objects have no tags may be included in the subset. In some cases, an image with three objects, where one of the objects is tagged "Bob," is included in the subset. In some embodiments, an image in the subset satisfies all object search criteria.

In some embodiments, a quantitative value representative of the degree to which an image satisfies a search is generated. A value may be generated for each image in a collection that is being searched. In some cases, a value is accumulated based on each object search criteria. Some object search criteria may be weighted more heavily than others. Weighting may take into consideration a confidence level associated with an object search criteria. For example, a user may be more confident about tag information than the number of objects associated with a desired image. An image with the correct tag properties but with a different number of objects may have a higher search score compared to an image that has the same number of objects but a different tag or no tag. The value generated may be a percentage, likelihood, rank, score, etc.

At 206, the subset is displayed. In some embodiments, the subset is displayed in a list. For example, a list of file names and directory paths of images in the subset may be displayed. In some embodiments, images in the subset are rendered and displayed. For example, a thumbnail of the images in a subset may be displayed. In some embodiments, display of the subset is based on a search score or other value; images in the subset may, for example, be displayed in accordance with their search score. Images with higher scores may be placed in a location where they are viewed first or are more easily visible. For example, the image with the highest score may be placed topmost and/or leftmost in a display window.

Figure 3:
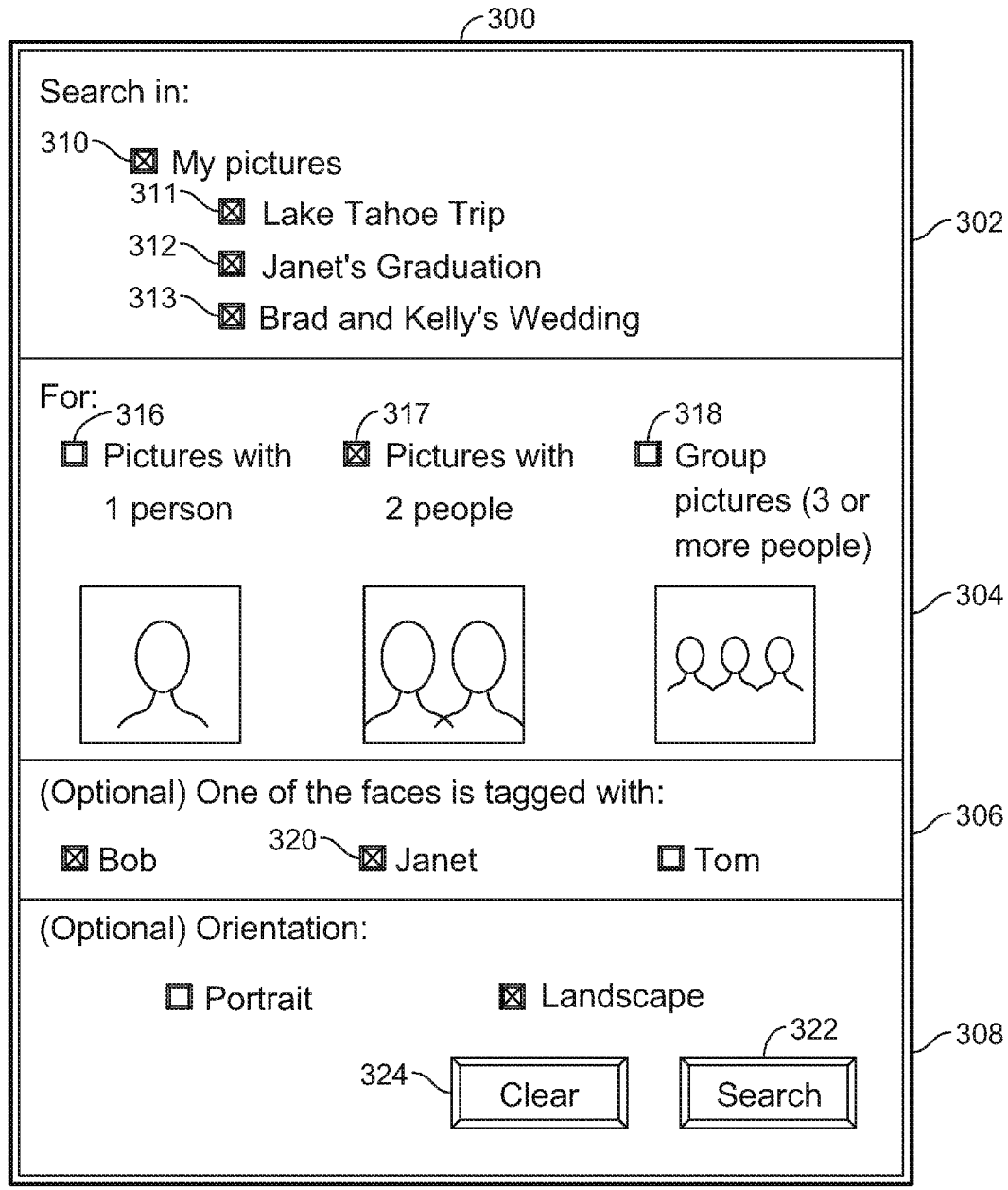
FIG. 3 is a diagram illustrating an embodiment of an interface to collect search related information from a user.

FIG. 3 is a diagram illustrating an embodiment of an interface to collect search related information from a user. In the example shown, interface 300 includes a number of panes, each of which has a variety of checkboxes associated with it. Pane 302 may be used by a user to specify the collection of images to search. A user may specify object search criterion, in this case the number of objects, using pane 304. Panes 306 and 308 in this example are associated with optional object search criteria; a user may optionally select one or more tags, or optionally specify an orientation to search for.

Pane 302 may be used to specify the collection of images to perform a search on. A user may select one or more of checkboxes 310-313 to specify images based on directories. A parent directory named "My Pictures" may include the child directories, "Lake Tahoe Trip," "Janet's Graduation," and "Brad and Kelly's Wedding." Each directory has a checkbox associated with it. Images in checked directories are included in the collection of images that are searched. A user may select the combination of checkboxes that is appropriate for his search. In this example, checkboxes 310-313 are selected. All images in the directories "Brad and Kelly's Wedding," "Janet's Graduation," and "Lake Tahoe Trip" are searched. In addition, any images in the directory "My Pictures" that are not in one of the child directories are also searched. If, however, the user is relatively certain the picture he is searching for is in "Lake Tahoe Trip," checkbox 311 alone may be selected.

In some embodiments, selecting checkbox 310 automatically triggers selection of checkboxes 311-313. Interface 300 may be automatically refreshed to display checkboxes 311-313 as selected when checkbox 310 is selected. With a single interaction, a user may be able to select child directories in addition to a parent directory. This may be convenient if a user wishes to search through most or all of the child directories in addition to the parent directory. In some file directory structures, there may be additional levels of hierarchy. The path of a directory may, for example, be "C:\My Pictures\Family\Janet's Graduation." Selecting "My Pictures" in some embodiments results in selection of child directories down to the lowest level. In some embodiments, selecting a checkbox associated with a parent directory does not automatically trigger selection of a child directory. A user may select child directories manually.

In some embodiments, a user is able to specify particular images within a directory to search. For example, by placing a mouse cursor above "Janet's Wedding" and double clicking the mouse, a list and/or thumbnails of the images in that directory may be shown. Using the list and/or thumbnails, a user may specify the particular images to include in the collection of images that are searched. A variety of interactions may be used. For example, a user may drag and drop a selected image, enter his selection in a dialogue box, or select from a pull down menu in order to add an image to the collection of images to search. In some embodiments, other interactions and/or presentation schemes besides those described are employed.

Pane 304 may be used to specify an object search criteria, in this case the number of objects associated with an image. A user may select one or more of checkboxes 316-318 illustrated in pane 304. Although only checkbox 317 (associated with searching for images with two objects) is selected, in some cases, checkboxes 316 and/or 318 may be selected as well. There may not necessarily be a restriction or limitation associated with allowed combinations.

In some embodiments, object search criteria may include size or dimension information associated with an object. For example, if checkbox 318 (associated with searching for group pictures of three or more objects) is selected, the object search criteria may include searching for images with objects that have similar sizes or dimensions. A group picture may be more likely to have faces depicted as approximately the same size. For example, although image 100 has three objects, objects 102 and 106 are intended to be depicted in the images whereas object 104 is associated with a bystander. The difference in the size of object 104 compared to objects 102 and 106 may indicate that object 104 was not necessarily intended to be in image 100. In some embodiments, object search criteria may include placement or location information. For example, objects 102 and 106 are located approximately in the center of image 100, whereas object 104 is not centered and is located some distance away from the other objects.

Although size or location information is not shown in interface 300, that information may be included in the object search criteria.

Panes 306 and 308 are associated with optional object search criteria. A user is not required to make selections in panes 306 and 308. Tag information may be specified using pane 306. In this example, the tag is associated with an object. By selecting checkbox 320, a user may configure a search to find images with objects that are tagged "Janet." In some cases, two or more tags are selected. Boolean operators may be used to specify relationships if multiple tags are specified. Orientation may be optionally specified in pane 308 and may be associated with an image. Selection of portrait orientation may exclude selection of landscape orientation and vice versa. That is, an image may have one orientation or the other, but not both. In some embodiments, orientation information is included in metadata. For example, some digital cameras may be able to detect when a user rotates a camera from its normal orientation. This orientation information may be stored as metadata with the image. In some cases, orientation is detected by an automatic detection process.

When a user is satisfied with the settings of interface 300, search button 322 may be used to initiate the search process using the information specified. A user may select clear button 324 to clear checkboxes in interface 300. Other appropriate buttons and associated functionality may be used in a search interface. Search related information may be specified using text input, such as a freeform text box. A user may enter in a search input box, "images in C:\Vacation that have two objects" to specify the collection of images searched and object search criteria. Natural language processing may be used to process the text input. Keywords may be defined for a user to use in text input. A user may be able to enter in a search input box, "images:numObjects=2; dir=C:\Vacation" in some embodiments.

In some embodiments, a reference image is created by a user and used in a search. A reference image may be conceptualized as a free form and/or graphical representation of a desired image that may include objects. A search process may examine a collection of images for images that match the reference image. A user may have many degrees of freedom using a reference image; a variety of information may be included in a reference image. The following figure illustrates an embodiment of a reference image and an embodiment of an interface to create a reference image.

Figure 4:
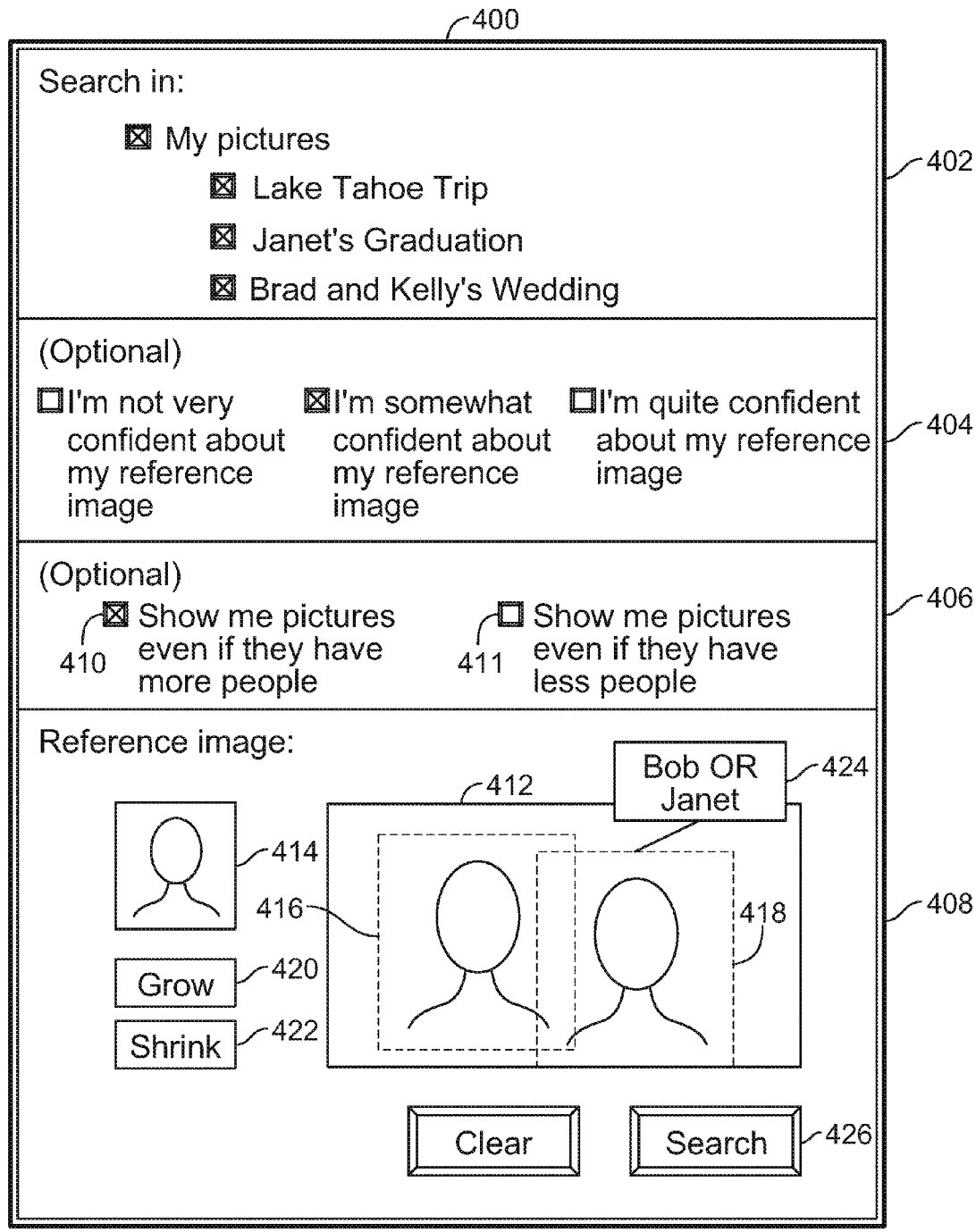
FIG. 4 is a diagram illustrating an embodiment of an interface to search through a collection of images using a reference image.

FIG. 4 is a diagram illustrating an embodiment of an interface to search through a collection of images using a reference image. In the example shown, a user constructs the reference image used in the search process. Object search criteria may be extracted from the reference image. Pane 402 may be used to specify the collection of images that are searched. Images in the selected directories are included in the collection of images that are searched.

Panes 404 and 406 are associated with optional object search criteria. A user may or may not choose to make a selection in these panes. A confidence level may be specified in pane 404. A user may indicate whether they are not very confident, somewhat confident, or quite confident about the reference image. Selection of one confidence level may exclude selection of any other confidence level so that at most one confidence level is selected. A sliding bar, dialogue box, or other interface may be used to obtain a confidence level. Pane 406 may be used to specify whether to include images with more and/or less objects in a subset of images resulting from a search. For example, by selecting checkbox 410, images with more objects than the number of objects in reference image 412 may be included in the subset of images resulting from a search. Selection of checkbox 410 (associated with images that have more objects) does not necessarily preclude selection of checkbox 411 (associated with images that have fewer objects). A user may be able to select both checkboxes.

Pane 408 may be used to construct reference image 412 used in a search. Initially, reference image 412 may be blank. Using object tool 414, a user may add objects 416 and 418 to reference image 412. The placement and/or size of an object in a reference image may be independent of any other object. Objects added to a reference image may default to a predefined size. Using grow button 420 or shrink button 422, the size of objects 416 and/or 418 may be adjusted. For example, a user may want to search for an image where the people are depicted as relatively small in the image. A desired image may be a photograph of people at the Grand Canyon or other scenic location where the people are small in the photograph to accommodate the scenery. Shrink button 422 may be used to reduce the size of objects 416 and/or 418. Conversely, a user may want to search for an image where the objects are relatively large, such as a silly picture where the faces of the people depicted fill up most of the image. Grow button 420 may be used to increase the size of an object in a reference image. Other interactions may be used to adjust a size or a dimension, such as selecting a corner or a side of an object in a reference image and dragging to expand or contract the corner or side. The placement of objects 416 and/or 418 may be adjusted. An object in a reference image may be moved up, down, left, or right. Arrow keys on a keyboard or an input device such as a stylus or mouse may be used to move a selected object.

Reference image 412 includes tag information 424 associated with object 418. A search using reference image 412 is thus configured to search for images with objects, where the object on the right is tagged with "Bob" or "Janet." A user may interact with interface 400 to add, delete, or modify tag information. A variety of techniques may be used to specify tag information. A freeform text box may be presented to a user, a pull down menu may present all tags associated with the collection of images being searched, etc. In some embodiments, a user may specify tag information associated with an image as opposed to an object. For example, a user may add tag information of "Lake Tahoe" to reference image 412 in order to search for images that have such a tag assigned to them. In some embodiments, a tag assigned to an image or object must exactly match tag information specified. For example, an image with an object tagged, "Bob Jones" may not necessarily be included in the subset of images resulting from a search for an object tagged "Bob." In other embodiments, a tag may partially match or include tag information included in object search criteria. For example, an image with an object tagged, "Bob Jones" may be included in the subset of images resulting from a search for an object tagged "Bob."

Once a user is satisfied with reference image 412, he may click on search button 426 to begin the search process using the information provided in interface 400. Object search criteria in some embodiments may be extracted from reference image 412 and possibly modified according to the information specified in panes 404 and 406. For example, the object search criteria may include size information based on the sizes of objects 416 and 418. In some embodiments, some margin may be used to account for a confidence level specified in pane 404. For example, if the user is a very confident about the size of objects in the reference image, a relatively small margin may be used. The object search criterion may thus include the range (size of object−smaller margin, size of object+smaller margin), whereas the range (size of object− larger margin, size of object+larger margin) is used if the user is not very confident about the reference image. In some embodiments, a user is able to specify a margin for an object. For example, a user may specify that object 416 is within 20% of the size shown in reference image 412.

Other information besides size information may be extracted from reference image 412. For example, location or placement information may be obtained from reference image 412. Objects 416 and 418 are roughly in the center of image 412. To search for a picture where the people are depicted in the lower right corner, the placement of the objects in reference image 412 may be adjusted. In some embodiments, relative placement or location information is used in a search. For example, the object search criteria may include searching for images where the object on the left is located higher than the object on the right. This may be useful if people depicted in a picture are at different heights. For example, one person may be taller than another, or some people may be standing while others are sitting.

In some embodiments, an actual or preexisting image is used in a search. An actual image used in a search may be referred to as an example image. For example, a user may select an image and click a "find similar images" button to perform a search using the example image and/or objects included in the example image. If, for example, the example image has two objects, one tagged "Bob" and the other tagged "Janet," a collection of images may be searched for images that include 1) two objects, 2) an object tagged "Bob" and/or 3) an object tagged "Janet."

Alternatively, the example image's attributes could be determined and used to populate search fields, such as that of FIG. 3. The values used to populate search fields may then be adjusted as desired by a user. This may be useful if an example image is similar but not identical to a desired image. For example, a first photograph may not include the person taking the picture. A bystander may have taken a second photograph so that the second photograph includes the person missing from the first photograph. A user in such cases may want to adjust information obtained from the example image before performing a search. After adjusting the populated values as desired, the user may click a "begin search" button to perform a search using the adjusted values.

An example image may be selected using a variety of interactions. For example, an example image may be selected by dragging and dropping, selecting an image and then selecting an action from a pull down menu, specifying a file using a dialogue box associated with example images, etc. These are some embodiments of how an example image may be selected and used in a search. In some embodiments, an example file is selected and/or used in a different manner.

Figure 5:
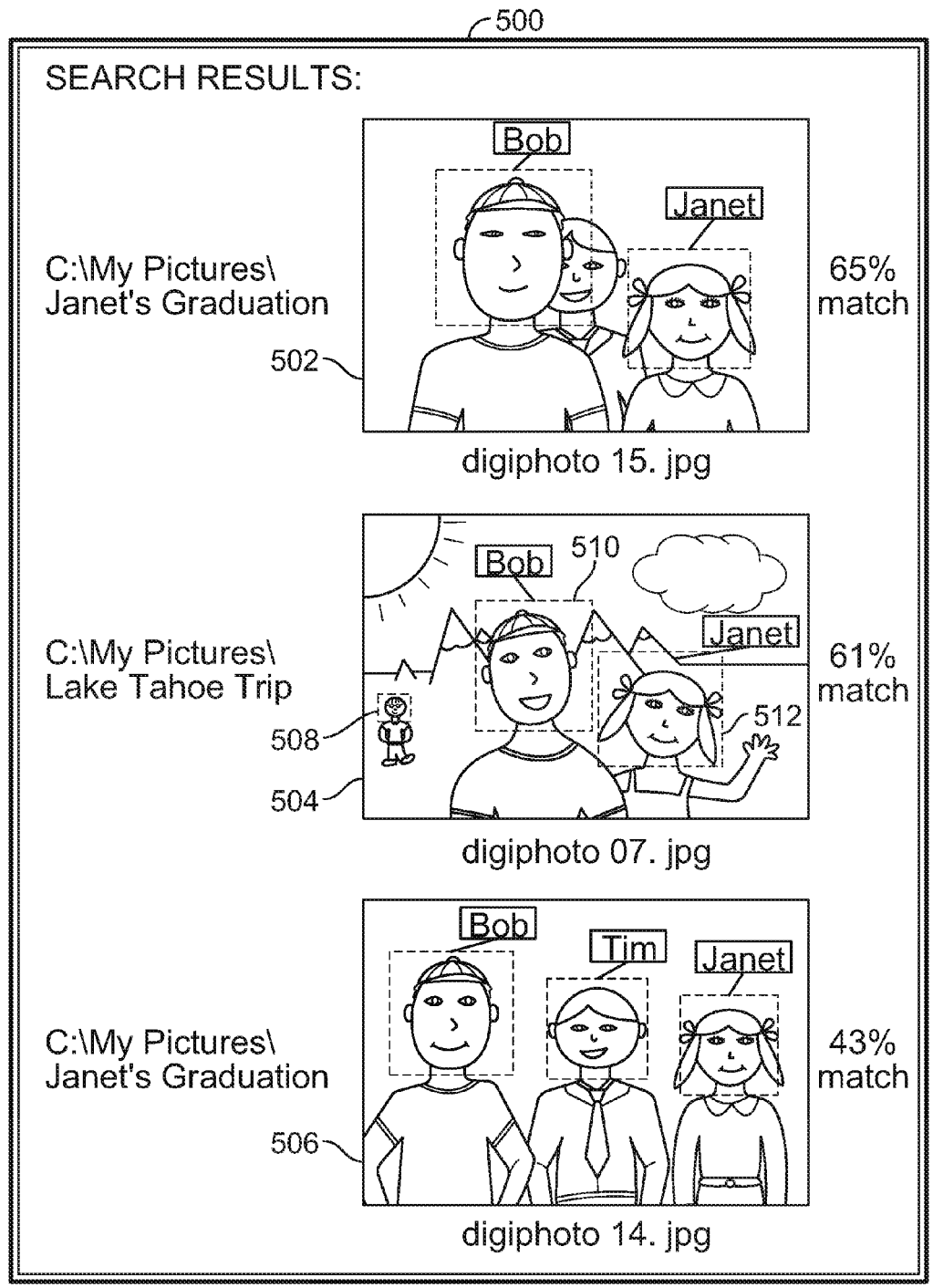
FIG. 5 is a diagram illustrating an embodiment of an interface for displaying a subset of images resulting from a search through a collection of images.
Figure 6:
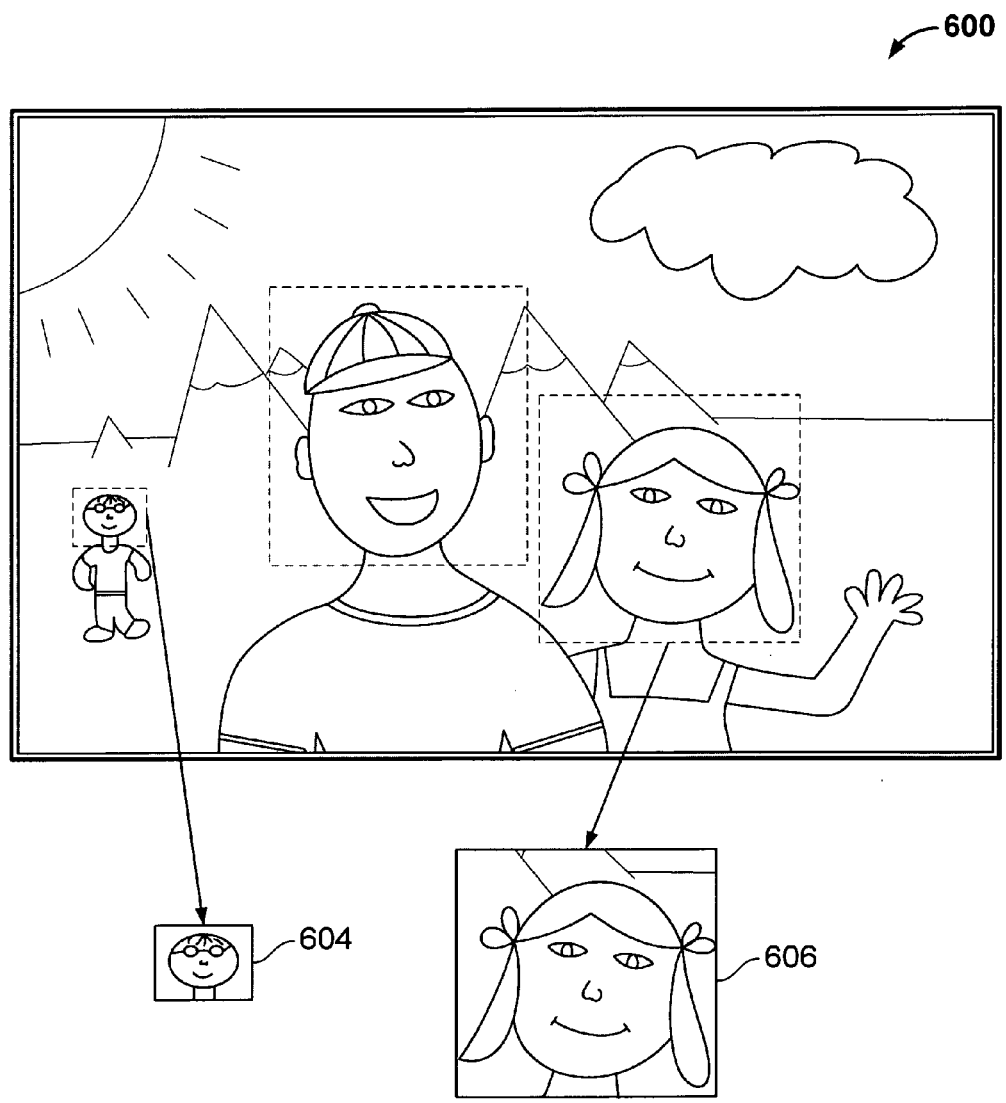
Figure 7:
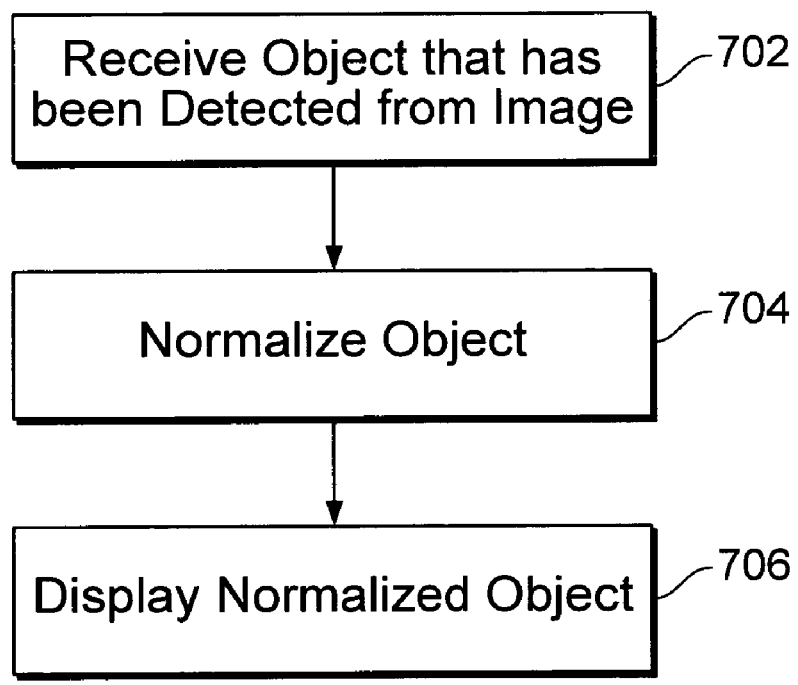
Figure 8A:
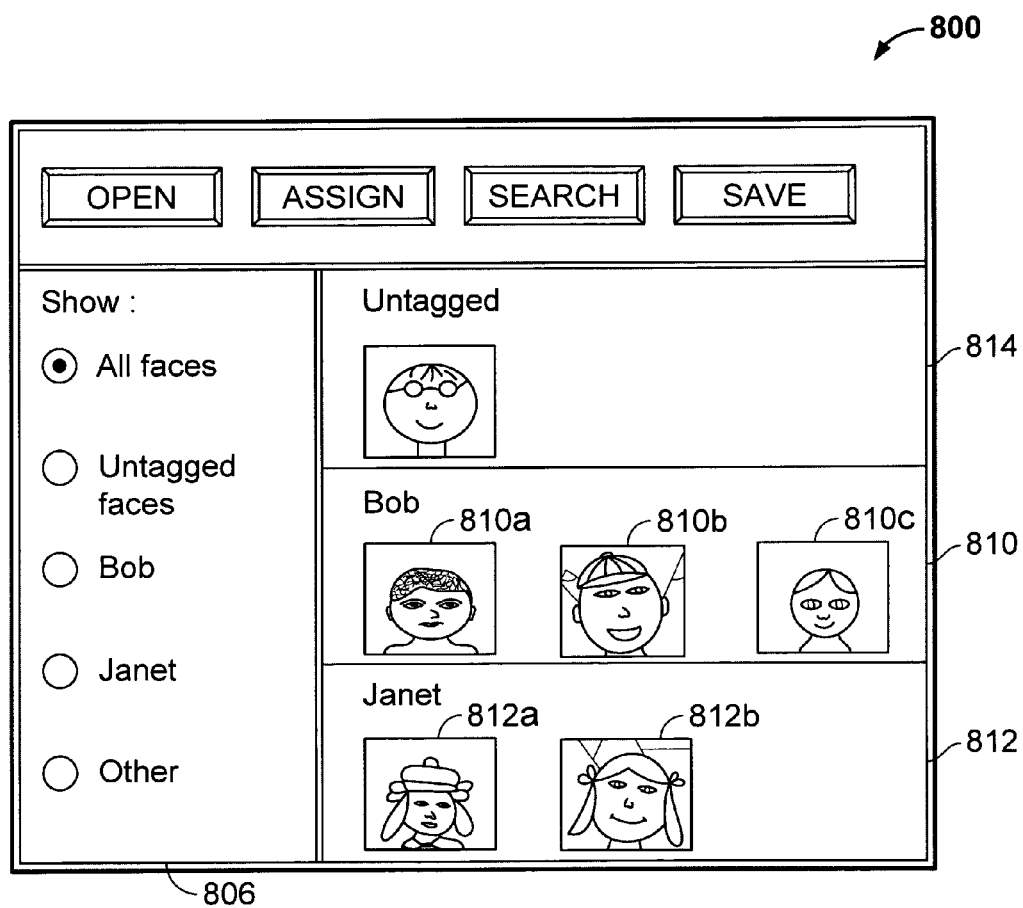
Figure 8B:
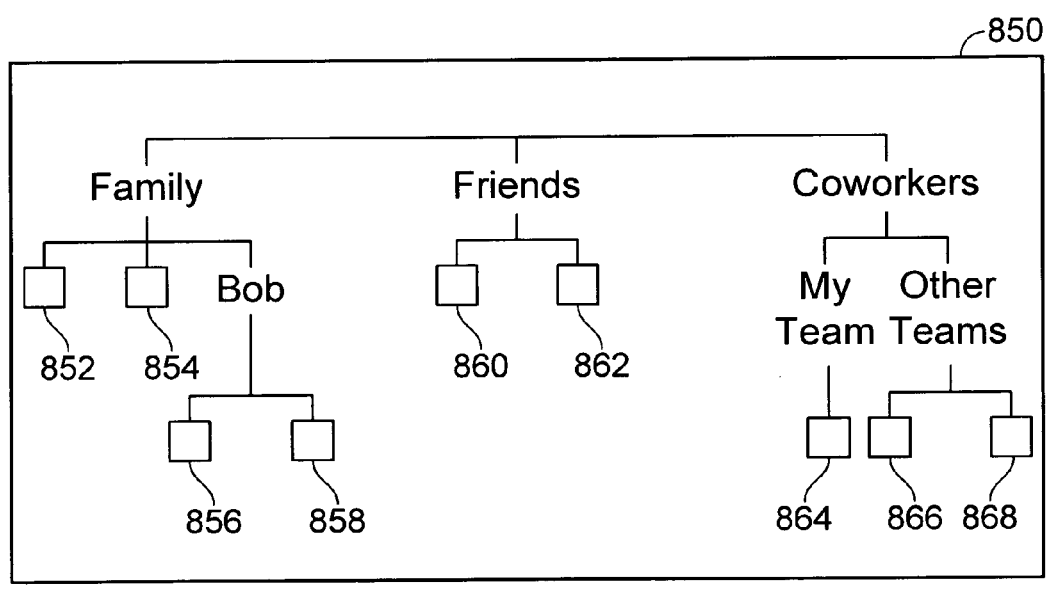
Figure 9:
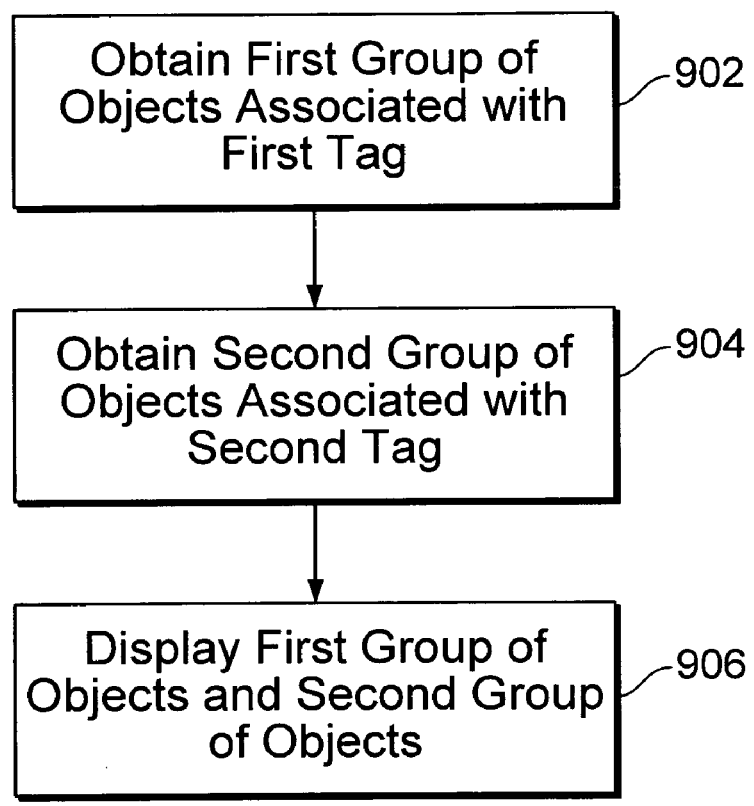
Figure 10:
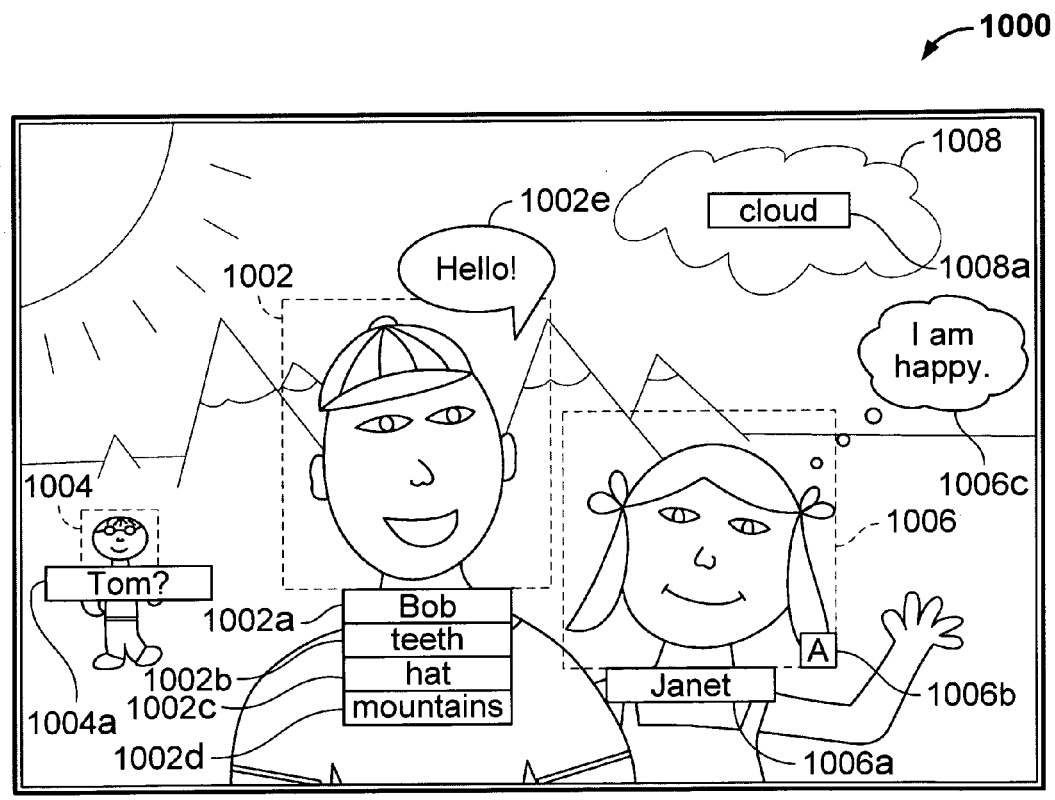
Figure 11:
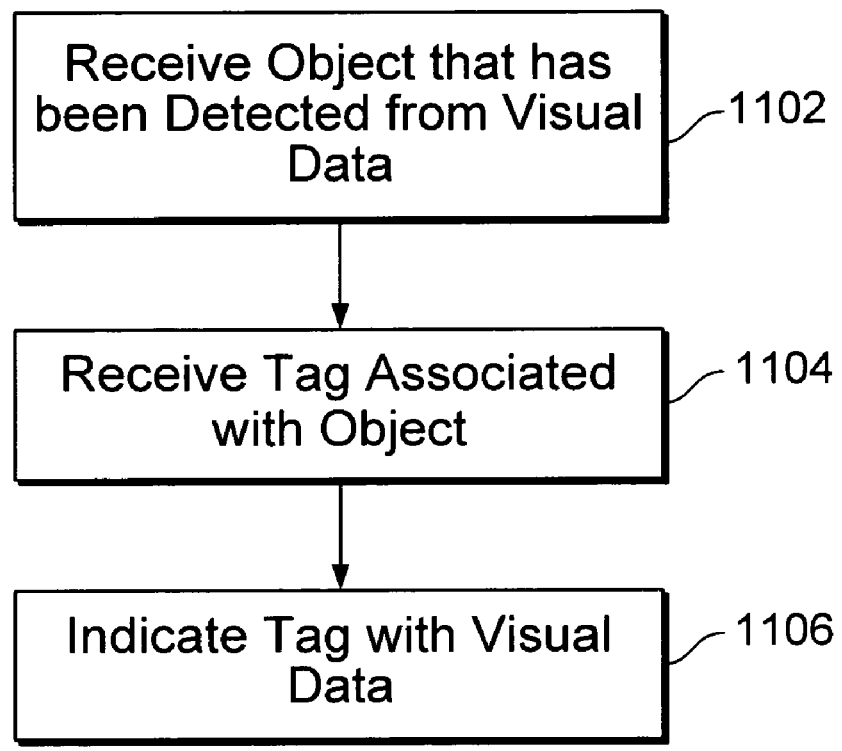
Figure 12:
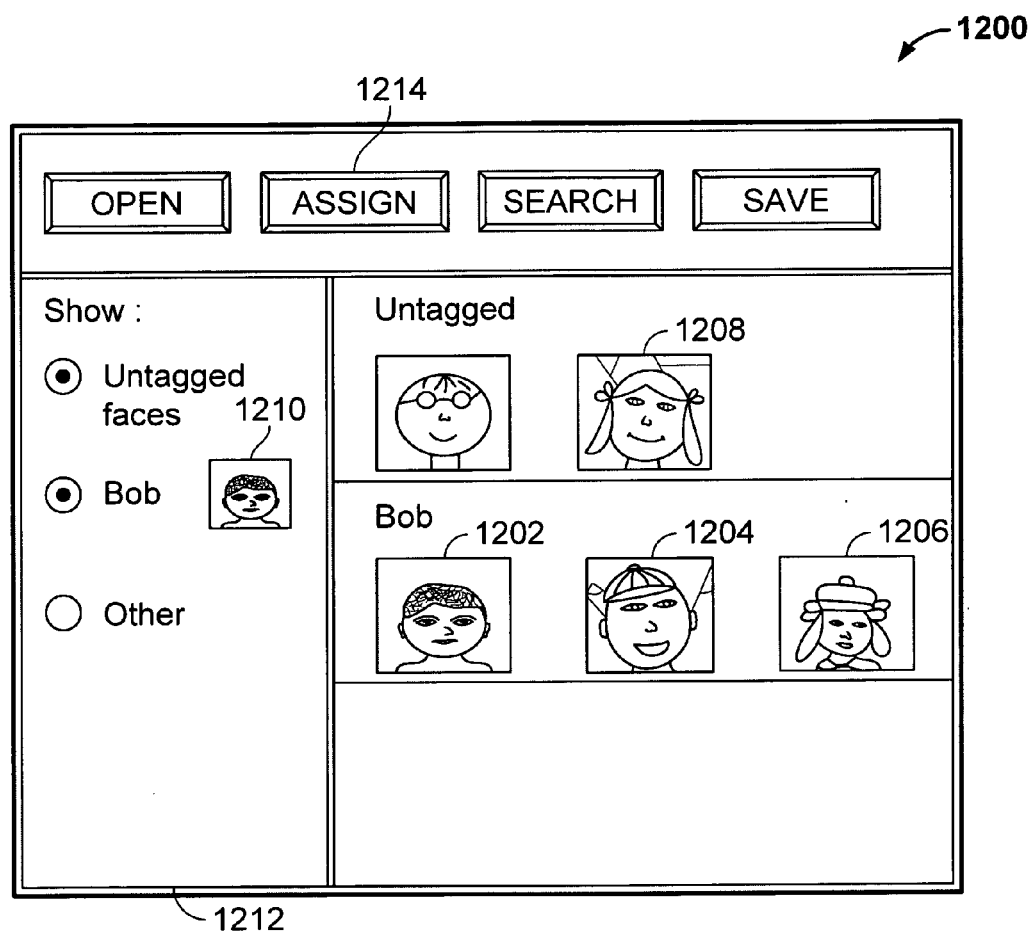
Figure 13:
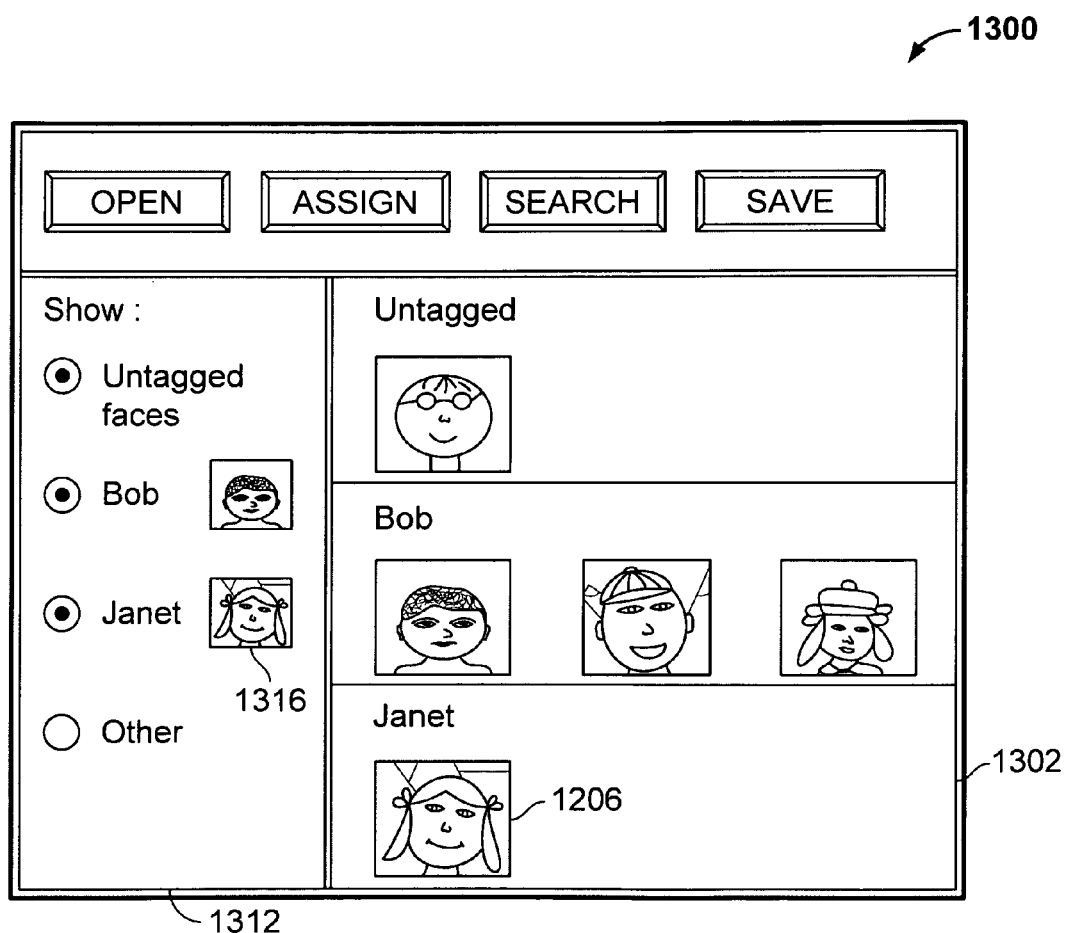
Figure 14:
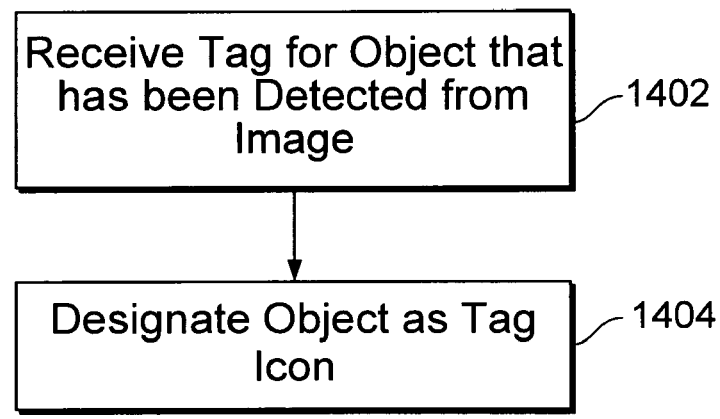
Figure 1A:
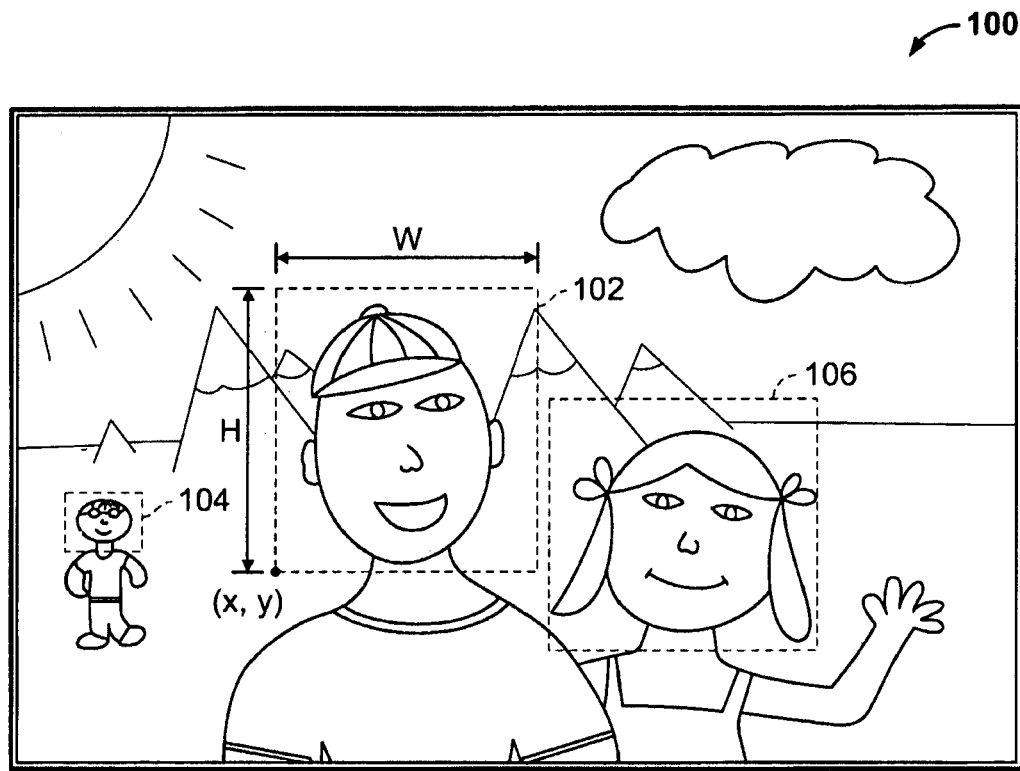
Figure 1B:
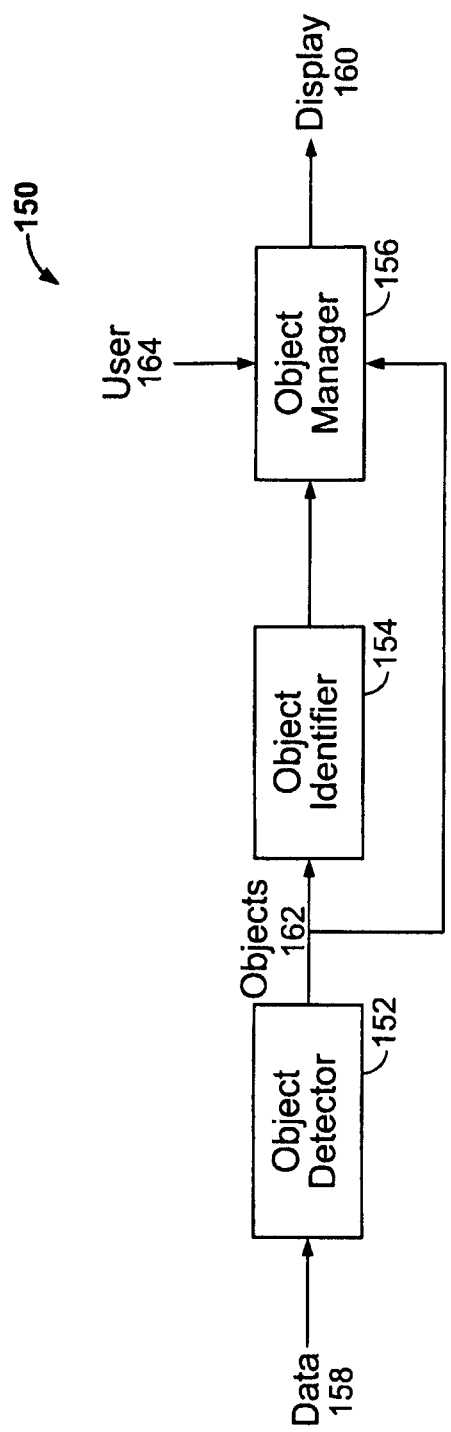
Figure 2:
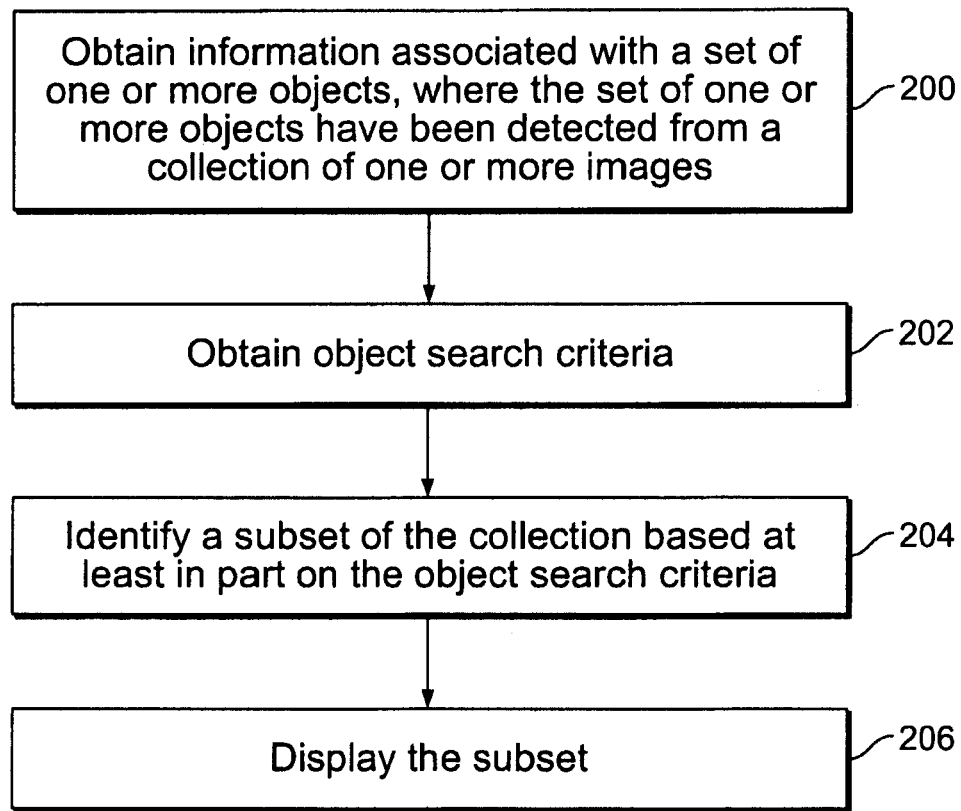
Figure 3:
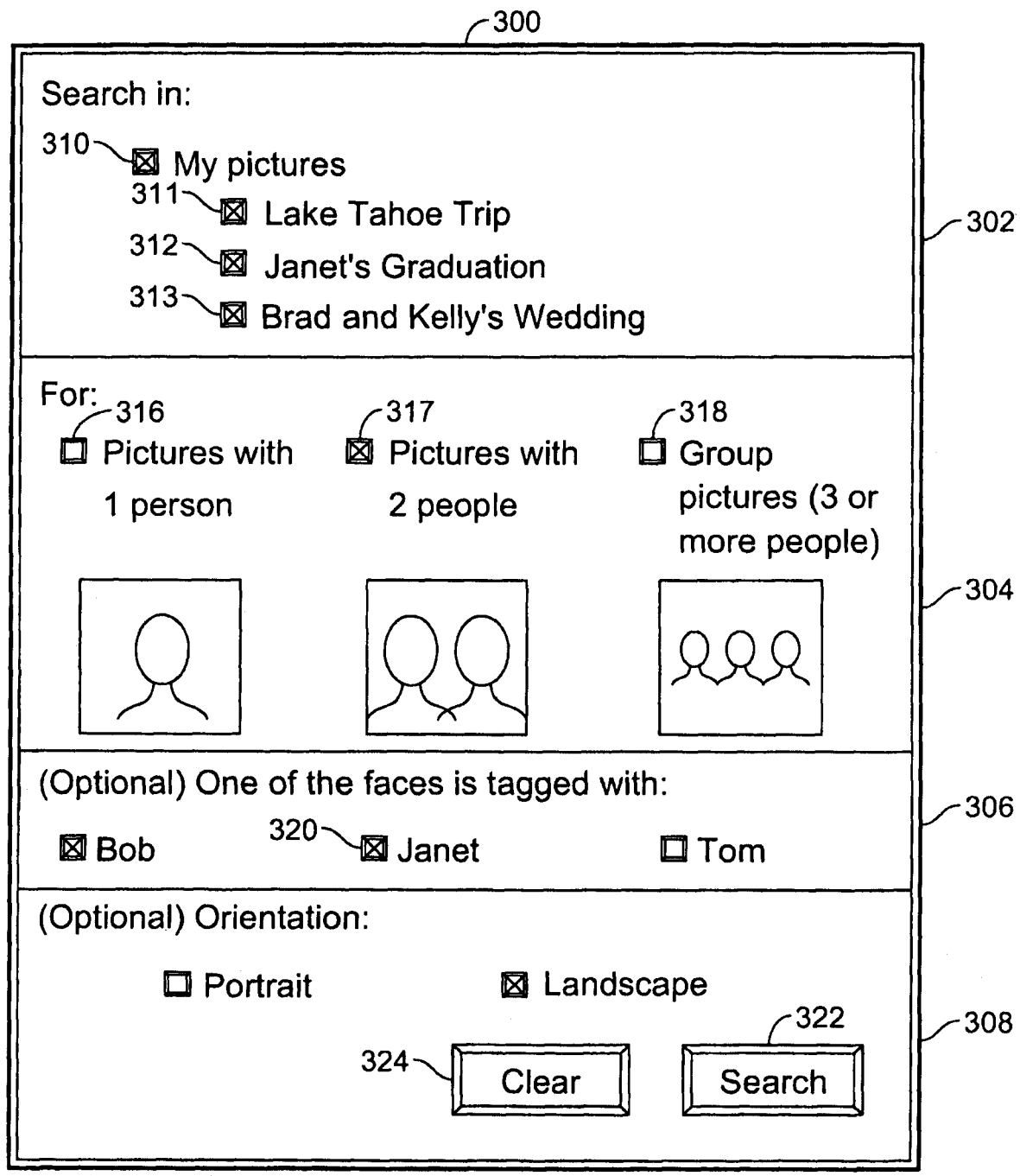
Figure 4:
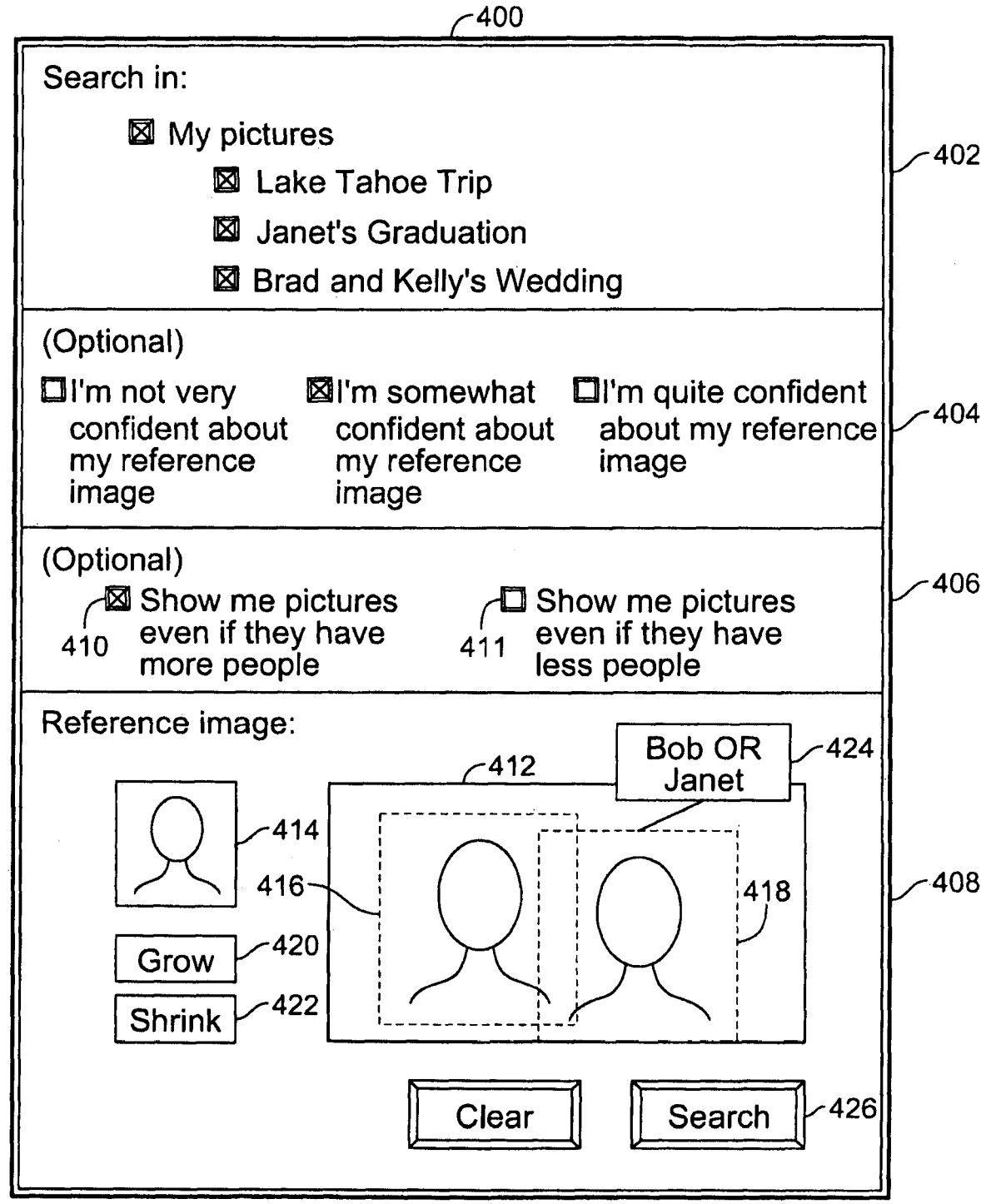
Figure 5:
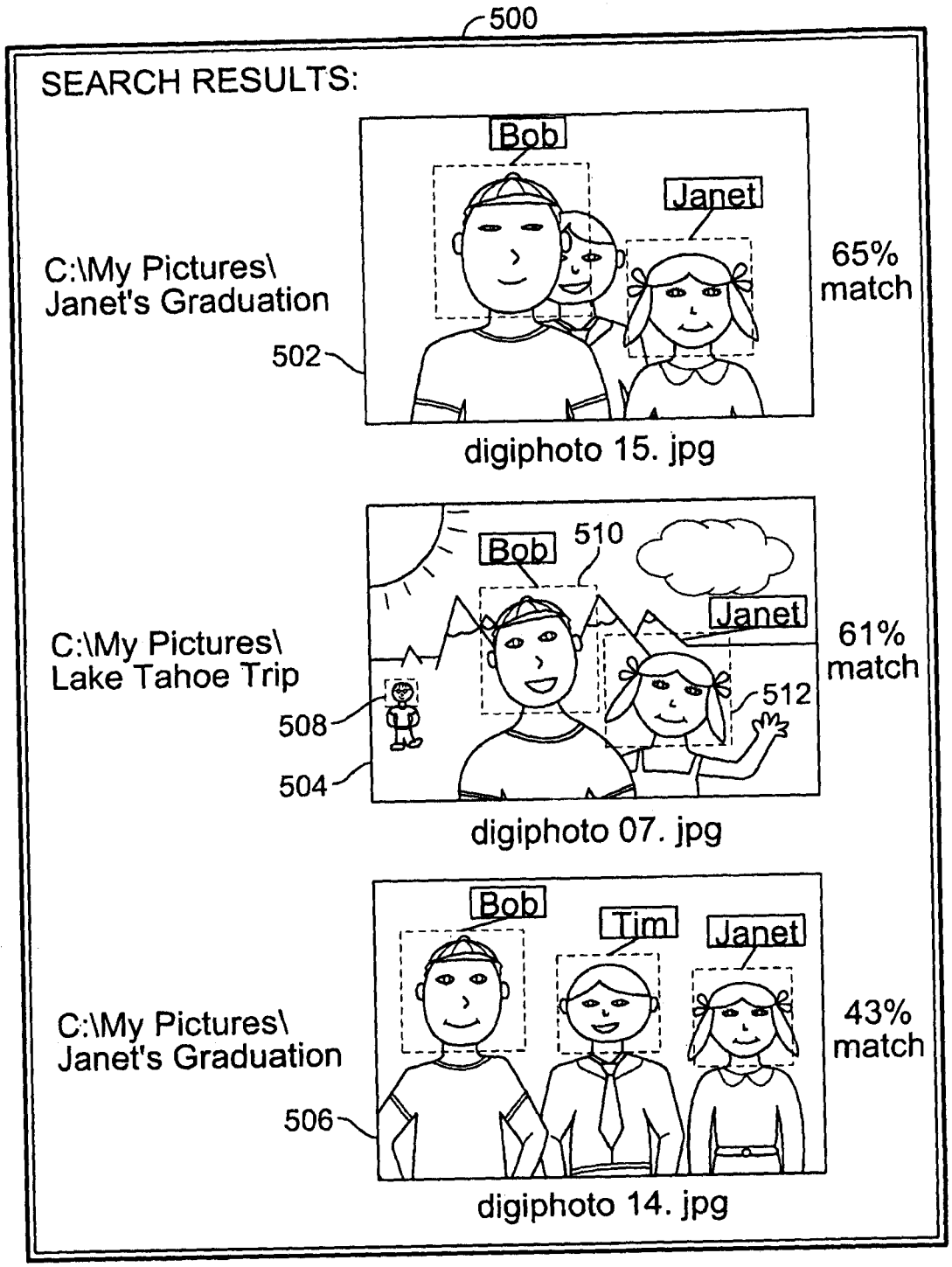
Figure 1A:
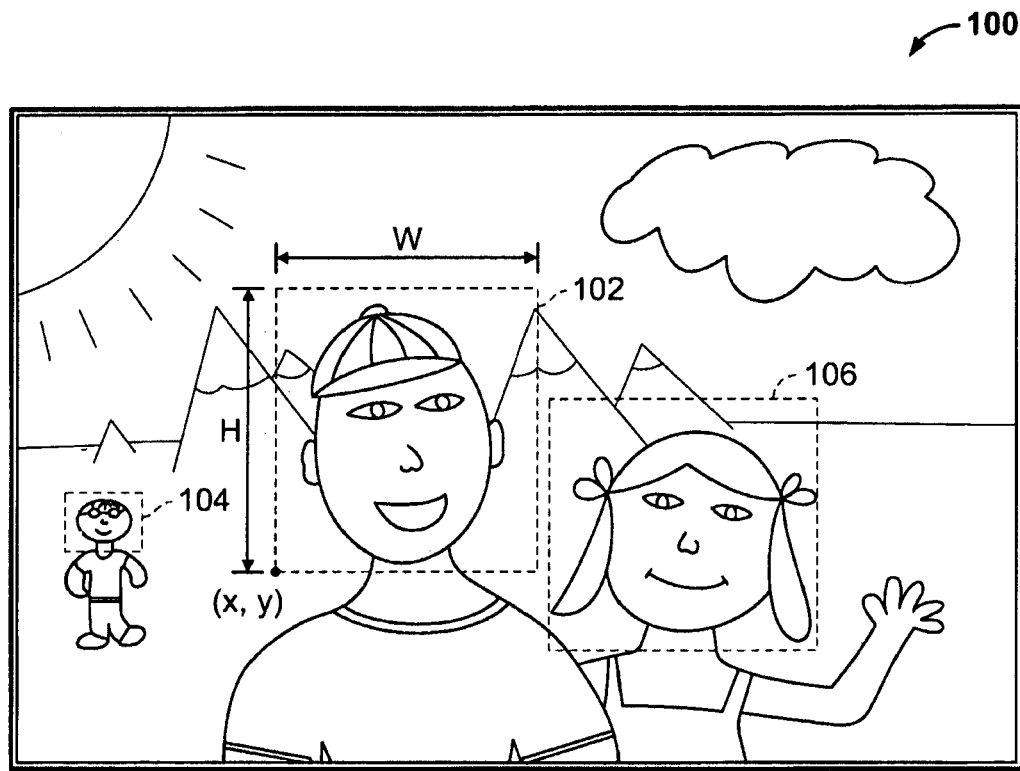
Figure 2:
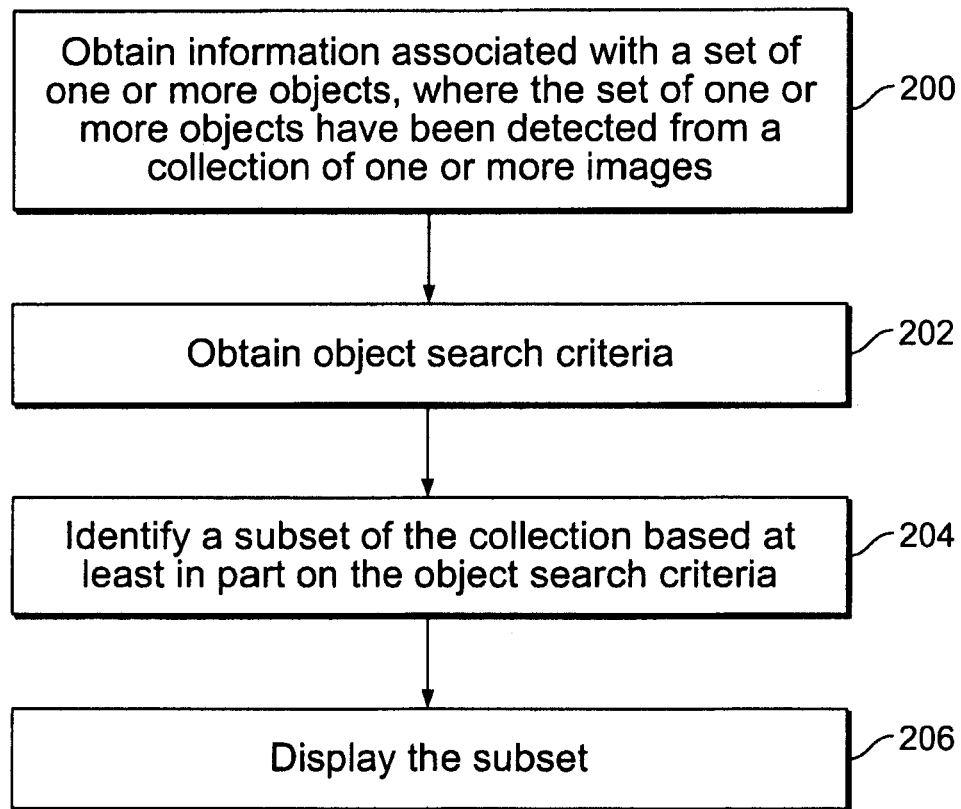
Figure 3:
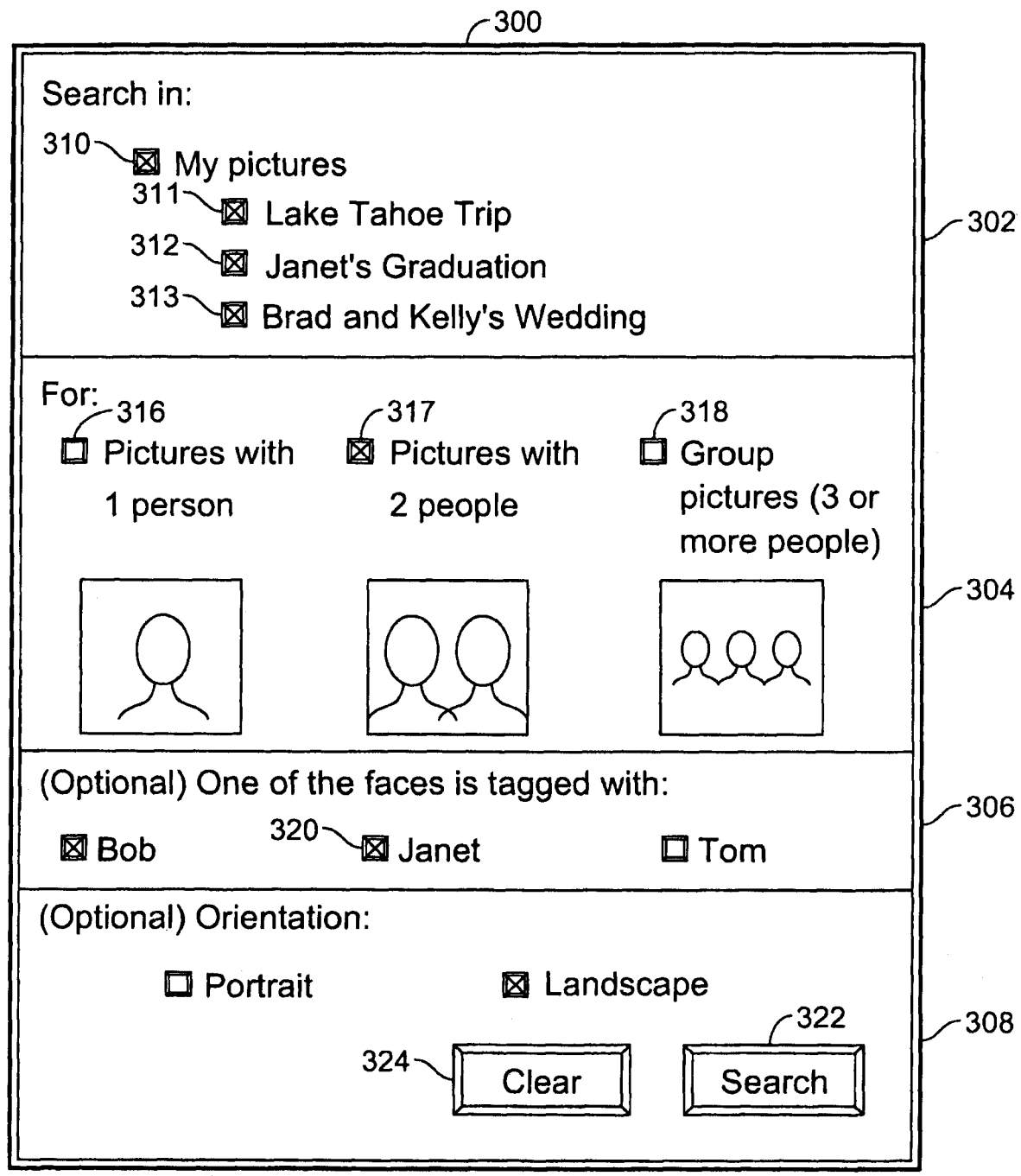
Figure 4:
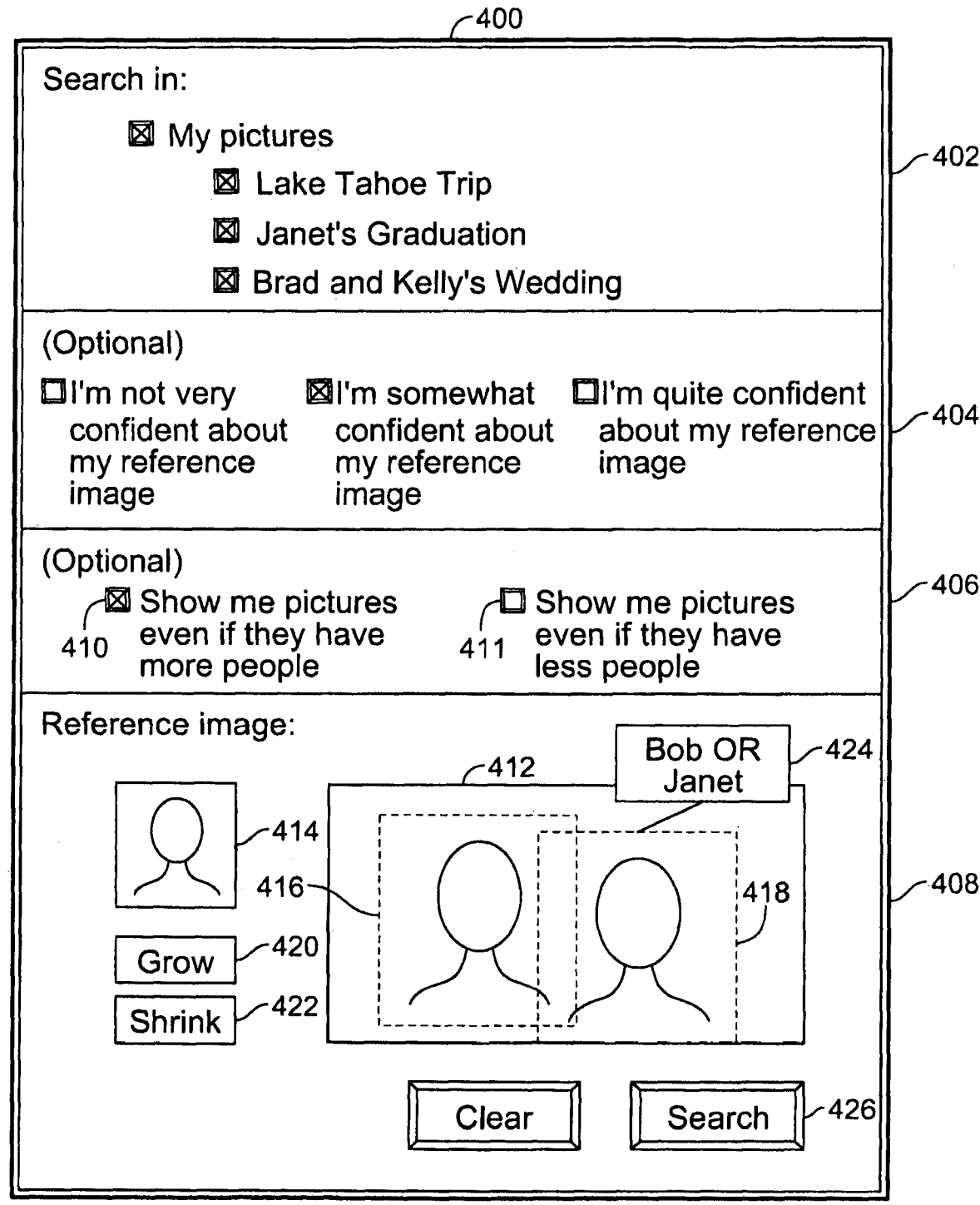
Figure 5:
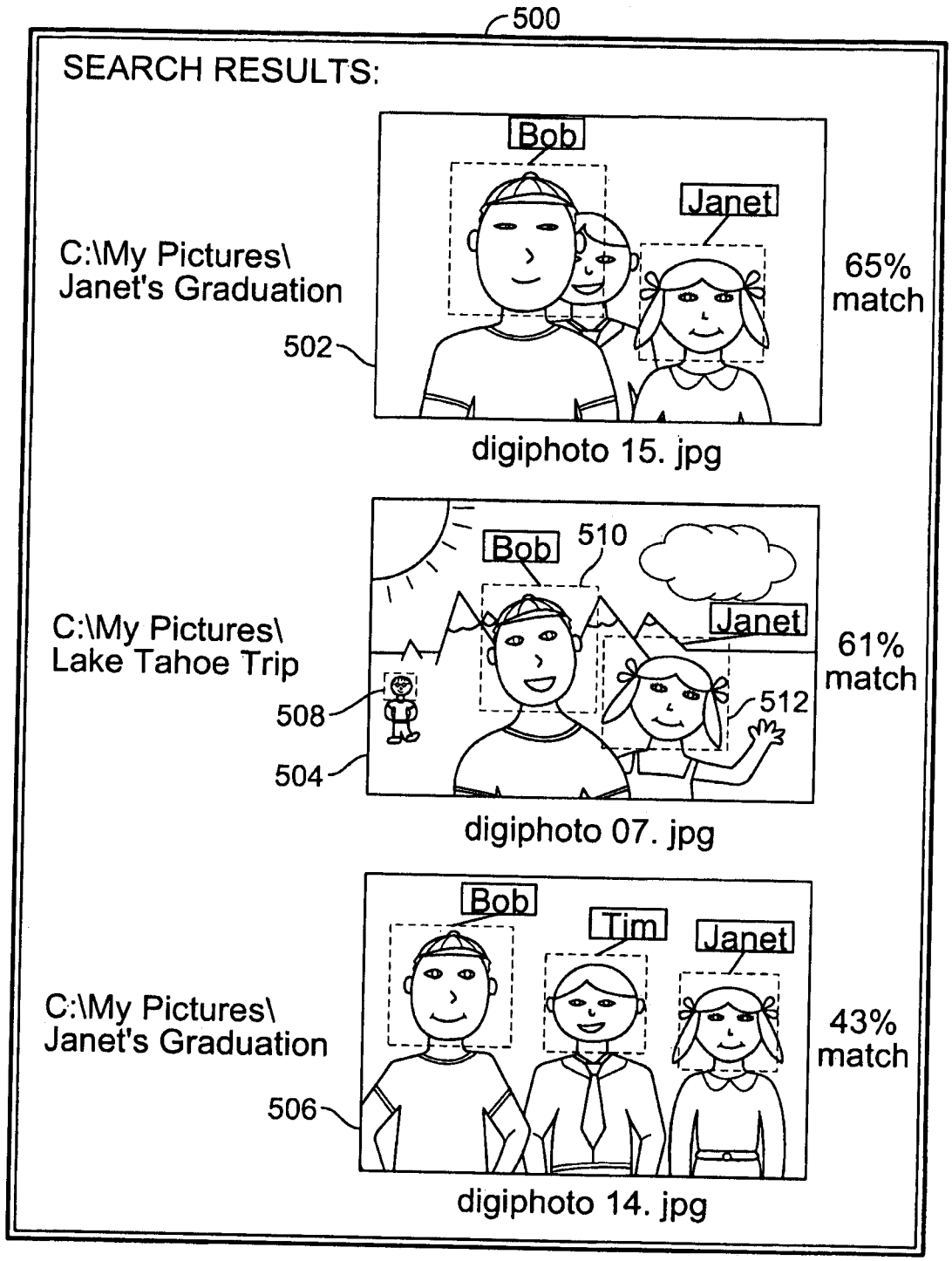

FIG. 5 is a diagram illustrating an embodiment of an interface for displaying a subset of images resulting from a search through a collection of images. In the example shown, interface 500 may be used to display the results of a search performed after obtaining search related information using interface 300 or 400. For each image in the subset, a path, a file name, a match percentage, and the image itself are displayed. The path may be associated with the location of the image in a file directory and the name may be the name of the image file.

The tags displayed in this example are the tags assigned to objects of the image. Viewing tags that are assigned to an image or an object may help a user evaluate the search results. A user may be able to toggle display of assigned tags off and on. Interface 500 may include a button that says "display tags assigned to my found images."

In this example, the images in the subset are displayed in descending order according to a match percentage. The match percentage may reflect the degree to which an associated image satisfies the object search criteria (and possibly other search criteria). In this example, the object search criteria includes images with two objects where the right object is tagged with "Bob" or "Janet." Image 502 satisfies the object search criteria the best of the images shown. It has exactly two objects and the object on the right is tagged with "Janet." Image 504 is similar to image 502 but there are three objects associated with the image, so the match probability may be lower to reflect this. Image 506 is similar to image 504 except that all of the objects in image 506 are approximately the same size, whereas object 508 is much smaller relative to objects 510 and 512. The much smaller size of object 508 may indicate that the person associated with object 508 was not intended to be in image 504. Image 504 may be considered to have effectively two objects and as such has a higher score compared to image 506. Interface 500 is an example of an interface for displaying search results. In other embodiments, different interfaces may be used to display search results.

In some embodiments, a subset of images resulting from a search may be displayed in any manner and is not limited to a match percent order. The subset may be ordered in any way and may be ordered, for example, by date. A match percentage may be displayed even if the images in the subset are not displayed in order of match percentage.

In some embodiments, object search criteria and any other search criteria specified using interface 300 or 400 may be displayed in interface 500. A reference image may be used in some searches. In some embodiments, the reference image is superimposed on the images displayed in interface 500. Rectangles associated with objects 416 and 418 may be superimposed on images 502, 504, and 506. A user may then be able to visualize how similar (or not) each image is compared to a reference image. In some embodiments, object search criterion or other search criteria are presented using other techniques. For example, a range of sizes may be presented in interface 500.

Although the foregoing embodiments have been described in some detail for purposes of clarity of understanding, the invention is not limited to the details provided. There are many alternative ways of implementing the invention. The disclosed embodiments are illustrative and not restrictive.

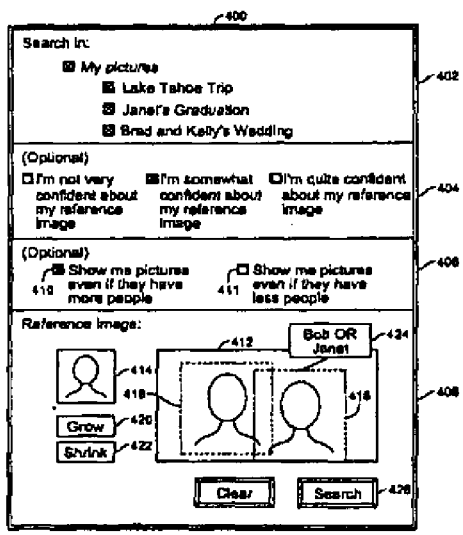

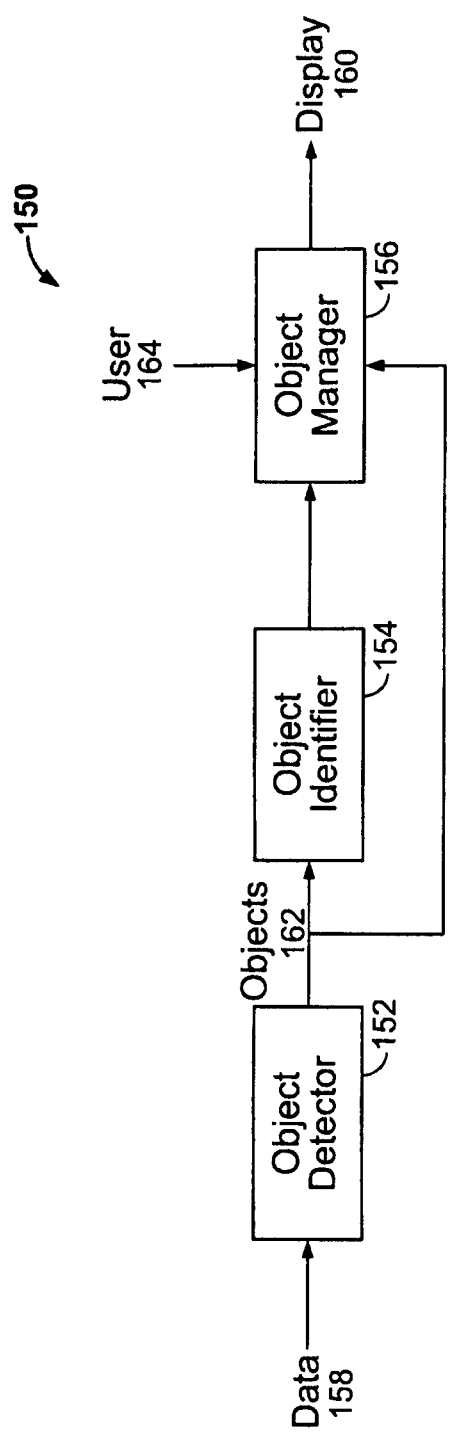

What is claimed is:

1. A method comprising:
obtaining information associated with a set of one or more objects, wherein: the set of one or more objects having been detected from a collection of one or more images using a face detection process; and
the information associated with the set of objects is output by the face detection process and includes values for a set of one or more parameters;
presenting a search interface via which a reference image having one or more reference face objects is obtained;
obtaining, via the search interface, object search criteria that includes the reference image;
determining, after the face detection process has been performed, a subset of the collection of one or more images that match the reference image based at least in part on a number of reference face objects in the reference image and a placement of the reference face objects within the reference image, wherein the placement of the reference face objects within the reference image is based at least in part on a calculated coordinates of the face objects within the reference image or on a the calculated coordinates of the face objects relative to the calculated coordinates of one or more other objects within the reference image, wherein the object search criteria further includes and determining is further based at least in part on one of the following: a tag assigned to at least one of the reference face objects, information associated with orientation, information associated with an accessory, or information associated with a tag assigned to an image, wherein determining is performed by a processor; and presenting the subset.

2. A method as recited in claim 1, wherein detecting includes an automatic detection process.

3. A method as recited in claim 1, wherein the information is obtained from a database.

4. A method as recited in claim 1, wherein determining is further based at least in part on the size of the reference face objects in the reference image.

5. A method as recited in claim 1, wherein a confidence level is associated with the object search criteria and identifying the subset includes considering the confidence level.

6. A method as recited in claim 1, wherein the reference image includes an image constructed by a user and presenting the search interface includes presenting one or more interface controls configured to add a new face object to the reference image, adjust the position of a selected face object in the reference image, and/or adjust the size of a selected face object in the reference image.

7. A method as recited in claim 1, wherein the reference image includes an image selected by a user and presenting the search interface includes presenting one or more interface controls configured to receive a selection of an image as the reference image.

8. A method as recited in claim 1, wherein determining includes using a margin.

9. A method as recited in claim 1, wherein the collection is specified by a user.

10. A method as recited in claim 1, further including calculating a degree to which the object search criteria is satisfied.

11. A method as recited in claim 1, wherein presenting includes displaying one or more images included in the subset.

12. A method as recited in claim 1, wherein the subset is presented according to a degree to which the object search criteria is satisfied.

13. A system comprising:
a processor; and
a memory coupled with the processor, wherein the memory is configured to provide the processor with instructions which when executed cause the processor to:
obtain information associated with a set of one or more objects, wherein:
the set of one or more objects having been detected from a collection of one or more images using a face detection process; and
the information associated with the set of objects is output by the face detection process and includes values for a set of one or more parameters;
present a search interface via which a reference image having one or more reference face objects is obtained;
obtain, via the search interface, object search criteria that includes the reference image;
determine, after the face detection process has been performed, a subset of the collection of one or more images that match the reference image based at least in part on a number of reference face objects in the reference image and a placement of the reference face objects within the reference image; wherein the placement of the reference face objects within the reference image is based at least in part on calculated coordinates of the face objects within the reference image or on calculated coordinates of the face objects relative to calculated coordinates of one or more other objects within the reference image, wherein the object search criteria further includes and determining is further based at least in part on one of the following: a tag assigned to at least one of the reference face objects, information associated with orientation, information associated with an accessory, or information associated with a tag assigned to an image; and
present the subset.

14. A system as recited in claim 13, wherein detecting includes an automatic detection process.

15. A computer program product being embodied in a computer readable storage medium and comprising computer instructions for:
obtaining information associated with a set of one or more objects, wherein:
the set of one or more objects having been detected from a collection of one or more images using a face detection process; and
the information associated with the set of objects is output by the face detection process and includes values for a set of one or more parameters;
presenting a search interface via which a reference image having one or more reference face objects is obtained;
obtaining, via the search interface, object search criteria that includes the reference image;
determining, after the face detection process has been performed, a subset of the collection of one or more images that match the reference image based at least in part on a number of reference face objects in the reference image and a placement of the reference face objects within the reference image; wherein the placement of the reference face objects within the reference image is based at least in part on calculated coordinates of the face objects within the reference image or on calculated coordinates of the face objects relative to calculated coordinates of one or more other objects within the reference image, wherein the object search criteria further includes and determining is further based at least in part on one of the following: a tag assigned to at least one of the reference face objects, information associated with orientation, information associated with an accessory, or information associated with a tag assigned to an image; and
presenting the subset.

16. A computer program product as recited in claim 15, wherein the object search criteria further includes and determining is further based at least in part on information associated with a tag assigned to an object.

17. A computer program product as recited in claim 15, the computer program product further comprising computer instructions for calculating a degree to which the object search criteria is satisfied.

18. A system as recited in claim 13, wherein the reference image includes an image constructed by a user and presenting the search interface includes presenting one or more interface controls configured to add a new face object to the reference image, adjust the position of a selected face object in the reference image, and/or adjust the size of a selected face object in the reference image.

19. A system as recited in claim 13, wherein the reference image is an image selected by a user and the instructions for presenting the search interface include instructions for presenting one or more interface controls configured to receive a selection of an image as the reference image.

20. A computer program product as recited in claim 15, wherein the reference image includes an image constructed by a user and presenting the search interface includes presenting one or more interface controls configured to add a new face object to the reference image, adjust the position of a selected face object in the reference image, and/or adjust the size of a selected face object in the reference image.

21. A computer program product as recited in claim 15, wherein the reference image is an image selected by a user and the computer instructions for presenting the search interface include computer instructions for presenting one or more interface controls configured to receive a selection of an image as the reference image.

22. A system as recited in claim 13, wherein determining is further based at least in part on the size of the reference face objects in the reference image.

23. A computer program product as recited in claim 15, wherein determining is further based at least in part on the size of the reference face objects in the reference image.

* * * * *

UNITED STATES PATENT AND TRADEMARK OFFICE
CERTIFICATE OF CORRECTION

PATENT NO. : 7,716,157 B1
APPLICATION NO. : 11/341247
DATED : May 11, 2010
INVENTOR(S) : Bourdev et al.

Page 1 of 8

It is certified that error appears in the above-identified patent and that said Letters Patent is hereby corrected as shown below:

-- Title page should be deleted and substitute therefor the attached title page --
-- In the drawings, delete Sheets 1-16, Figs. 1A-14 --
-- Replace with Sheets 1-6, Figs. 1A-5 as follows --

Signed and Sealed this

Thirteenth Day of July, 2010

David J. Kappos
*Director of the United States Patent and Trademark Office*

(12) United States Patent (10) Patent No.: US 7,716,157 B1
Bourdev et al. (45) Date of Patent: May 11, 2010

(54) SEARCHING IMAGES WITH EXTRACTED OBJECTS

(75) Inventors: Lubomir Bourdev, San Jose, CA (US); Claire Schendel, Petaluma, CA (US); Jeffery Scott Heileson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 114 days.

(21) Appl. No.: 11/341,247

(22) Filed: Jan. 26, 2006

(51) Int. Cl.
*G06F 7/00* (2006.01)

(52) U.S. Cl. .................. 707/2; 707/3; 707/4; 707/5; 707/6

(58) Field of Classification Search .................. 707/2
See application file for complete search history.

(56) References Cited

U.S. PATENT DOCUMENTS

| | | | |
|---|---|---|---|
| 4,651,146 A | 3/1987 | Lucash et al. | |
| 5,943,093 A | 8/1999 | Anderson et al. | |
| 5,963,203 A | 10/1999 | Goldberg et al. | |
| 6,182,069 B1 * | 1/2001 | Niblack et al. | 707/6 |
| 6,324,555 B1 | 11/2001 | Sites | |
| 6,366,296 B1 | 4/2002 | Boreczky et al. | |
| 6,714,672 B1 | 3/2004 | Berestov et al. | |
| 6,728,728 B2 | 4/2004 | Spiegler et al. | |
| 6,879,709 B2 | 4/2005 | Tian et al. | |
| 6,940,545 B1 | 9/2005 | Ray et al. | |
| 7,155,036 B2 * | 12/2006 | Li | 382/118 |
| 7,171,023 B2 | 1/2007 | Kim et al. | |
| 7,274,832 B2 * | 9/2007 | Nicponski | 382/297 |
| 7,343,365 B2 | 3/2008 | Farnham et al. | |
| 7,403,642 B2 | 7/2008 | Zhang et al. | |
| 7,477,805 B2 | 1/2009 | Ohtsuka et al. | |
| 7,519,200 B2 | 4/2009 | Gokturk et al. | |
| 7,587,101 B1 | 9/2009 | Bourdev | |
| 2001/0053292 A1 | 12/2001 | Nakamura | |
| 2002/0074398 A1 | 6/2002 | Lancos et al. | |
| 2002/0103813 A1 | 8/2002 | Frigon | |
| 2003/0023754 A1 | 1/2003 | Eichstadt et al. | |
| 2003/0033296 A1 | 2/2003 | Rothmuller et al. | |
| 2003/0210808 A1 | 11/2003 | Chen et al. | |
| 2004/0008906 A1 | 1/2004 | Webb | |
| 2004/0017930 A1 * | 1/2004 | Kim et al. | 382/103 |
| 2004/0060976 A1 | 4/2004 | Blazey et al. | |
| 2004/0064455 A1 | 4/2004 | Rosenzweig et al. | |
| 2004/0101212 A1 | 5/2004 | Fedorovskaya et al. | |
| 2004/0204635 A1 | 10/2004 | Scharf et al. | |
| 2004/0267612 A1 | 12/2004 | Veach | |

(Continued)

OTHER PUBLICATIONS

Jannifer Granick, "Face It: Privacy Is Endangered", Dec. 7, 2005.*

(Continued)

*Primary Examiner*—Hung T Vy
*Assistant Examiner*—Binh V Ho
(74) *Attorney, Agent, or Firm*—Van Pelt, Yi & James LLP

(57) ABSTRACT

Presenting a subset is disclosed. Information associated with a set of one or more objects is obtained, where the set of one or more objects have been detected from a collection of one or more images. Object search criteria is obtained. A subset of the collection is determined based at least in part on the object search criteria. The subset is presented.

23 Claims, 16 Drawing Sheets

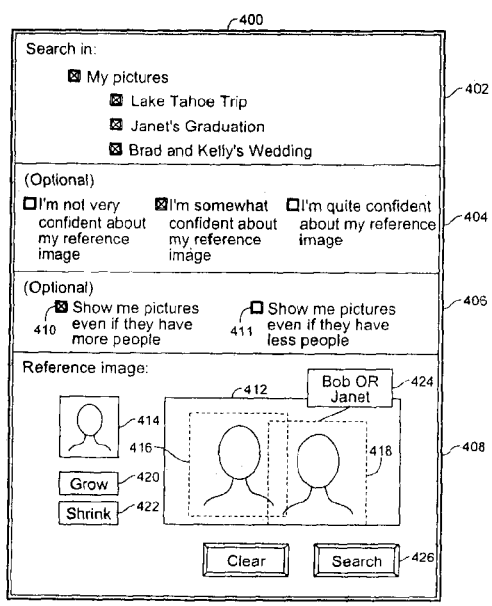

UNITED STATES PATENT AND TRADEMARK OFFICE
CERTIFICATE OF CORRECTION

PATENT NO.         : 7,716,157 B1                                           Page 1 of 8
APPLICATION NO. : 11/341247
DATED              : May 11, 2010
INVENTOR(S)        : Bourdev et al.

It is certified that error appears in the above-identified patent and that said Letters Patent is hereby corrected as shown below:

-- Title page should be deleted and substitute therefor the attached title page --
    -- In the drawings, delete Sheets 1-16, Figs. 1A-14 --
    -- Replace with Sheets 1-6, Figs. 1A-5 as follows --

This certificate supersedes the Certificate of Correction issued July 13, 2010.

Signed and Sealed this

Twenty-first Day of December, 2010

David J. Kappos
*Director of the United States Patent and Trademark Office*

(12) United States Patent
Bourdev et al.

(10) Patent No.: US 7,716,157 B1
(45) Date of Patent: May 11, 2010

(54) SEARCHING IMAGES WITH EXTRACTED OBJECTS

(75) Inventors: Lubomir Bourdev, San Jose, CA (US); Claire Schendel, Petaluma, CA (US); Jeffery Scott Helleson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 114 days.

(21) Appl. No.: 11/341,247

(22) Filed: Jan. 26, 2006

(51) Int. Cl.
*G06F 7/00* (2006.01)

(52) U.S. Cl. .................. 707/2; 707/3; 707/4; 707/5; 707/6

(58) Field of Classification Search .................. 707/2
See application file for complete search history.

(56) References Cited

U.S. PATENT DOCUMENTS

| | | | |
|---|---|---|---|
| 4,651,146 A | 3/1987 | Lucash et al. | |
| 5,943,093 A | 8/1999 | Anderson et al. | |
| 5,963,203 A | 10/1999 | Goldberg et al. | |
| 6,182,069 B1 * | 1/2001 | Niblack et al. | 707/6 |
| 6,324,555 B1 | 11/2001 | Sites | |
| 6,366,296 B1 | 4/2002 | Boreczky et al. | |
| 6,714,672 B1 | 3/2004 | Berestov et al. | |
| 6,728,728 B2 | 4/2004 | Spiegler et al. | |
| 6,879,709 B2 | 4/2005 | Tian et al. | |
| 6,940,545 B1 | 9/2005 | Ray et al. | |
| 7,155,036 B2 * | 12/2006 | Li | 382/118 |
| 7,171,023 B2 | 1/2007 | Kim et al. | |
| 7,274,832 B2 * | 9/2007 | Nicponski | 382/297 |
| 7,343,365 B2 | 3/2008 | Farnham et al. | |
| 7,403,642 B2 | 7/2008 | Zhang et al. | |
| 7,477,805 B2 | 1/2009 | Ohtsuka et al. | |
| 7,519,200 B2 | 4/2009 | Gokturk et al. | |
| 7,587,101 B1 | 9/2009 | Bourdev | |
| 2001/0053292 A1 | 12/2001 | Nakamura | |
| 2002/0074398 A1 | 6/2002 | Lancos et al. | |
| 2002/0103813 A1 | 8/2002 | Frigon | |
| 2003/0023754 A1 | 1/2003 | Eichstadt et al. | |
| 2003/0033296 A1 | 2/2003 | Rothmuller et al. | |
| 2003/0210808 A1 | 11/2003 | Chen et al. | |
| 2004/0008906 A1 | 1/2004 | Webb | |
| 2004/0017930 A1 * | 1/2004 | Kim et al. | 382/103 |
| 2004/0060976 A1 | 4/2004 | Blazey et al. | |
| 2004/0064455 A1 | 4/2004 | Rosenzweig et al. | |
| 2004/0101212 A1 | 5/2004 | Fedorovskaya et al. | |
| 2004/0204635 A1 | 10/2004 | Scharf et al. | |
| 2004/0267612 A1 | 12/2004 | Veach | |

(Continued)

OTHER PUBLICATIONS

Jennifer Granick, "Face It: Privacy Is Endangered", Dec. 7, 2005.*

(Continued)

*Primary Examiner*—Hung T Vy
*Assistant Examiner*—Binh V Ho
(74) *Attorney, Agent, or Firm*—Van Pelt, Yi & James LLP

(57) ABSTRACT

Presenting a subset is disclosed. Information associated with a set of one or more objects is obtained, where the set of one or more objects have been detected from a collection of one or more images. Object search criteria is obtained. A subset of the collection is determined based at least in part on the object search criteria. The subset is presented.

23 Claims, 6 Drawing Sheets